US010970793B1

(12) United States Patent
Wang et al.

(10) Patent No.: US 10,970,793 B1
(45) Date of Patent: Apr. 6, 2021

(54) METHODS SYSTEMS AND ARTICLES OF MANUFACTURE FOR TAILORING A USER EXPERIENCE IN PREPARING AN ELECTRONIC TAX RETURN

(71) Applicant: Intuit Inc., Mountain View, CA (US)

(72) Inventors: Gang Wang, San Diego, CA (US); Kevin M. McCluskey, Carlsbad, CA (US); William T. Laaser, Palo Alto, CA (US); Luis F. Cabrera, Bellevue, WA (US); Per-Kristian Halvorsen, Los Altos Hills, CA (US); Matthew A. Lisowski, Ramona, CA (US)

(73) Assignee: INTUIT INC., Mountain View, CA (US)

(*) Notice: Subject to any disclaimer, the term of this patent is extended or adjusted under 35 U.S.C. 154(b) by 433 days.

(21) Appl. No.: 14/462,411

(22) Filed: Aug. 18, 2014

(51) Int. Cl.
G06Q 40/00 (2012.01)
(52) U.S. Cl.
CPC .................. G06Q 40/123 (2013.12)
(58) Field of Classification Search
CPC ..................................... G06Q 40/123
USPC .......................................................... 705/31
See application file for complete search history.

(56) References Cited

U.S. PATENT DOCUMENTS

| 4,213,251 A | 7/1980 | Foundos |
| 4,809,219 A | 2/1989 | Ashford et al. |
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |

(Continued)

FOREIGN PATENT DOCUMENTS

| JP | 2002-117121 A | 4/2002 |
| JP | 2005-190425 A | 7/2005 |

(Continued)

OTHER PUBLICATIONS

Solomon L. Pollack; Analysis of the Decision Rules in Decision Tables, May 1963; The Rand Corooration; pp. iii, iv, 1, 20, & 24 (Year: 1963).*

(Continued)

Primary Examiner — Gregory A Pollock
(74) Attorney, Agent, or Firm — DLA Piper LLP (US)

(57) ABSTRACT

Methods, systems and articles of manufacture for a method for generating a database of tax correlation data which can be used for tailoring a user experience in preparing an electronic tax return. A computing device accesses a data source having a plurality of data records. Each data record comprises a taxpayer attribute and a tax related aspect for a respective taxpayer. The computing device analyzes the plurality of data records and determines a correlation between the taxpayer attribute and the tax related aspect and determines a probability for the correlation. The computing device utilizes the probability for the correlation to determine a quantitative relevancy score for a tax matter, which can be incorporated into the tax correlation data of the life/knowledge module.

25 Claims, 17 Drawing Sheets

(56) References Cited

U.S. PATENT DOCUMENTS

| | | |
|---|---|---|
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 * | 3/2013 | Eftekhari ............ G06Q 40/123 705/31 |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0065831 A1 | 5/2002 | DePaolo |
| 2002/0107698 A1 | 8/2002 | Brown et al. |
| 2002/0111888 A1 | 8/2002 | Stanley |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendori et al. |
| 2010/0131394 A1 * | 5/2010 | Rutsch ............... G06Q 40/02 705/31 |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |

(56) References Cited

U.S. PATENT DOCUMENTS

| | | |
|---|---|---|
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Office Action dated Sep. 14, 2017 in U.S. Appl. No. 14/530,159, (41pages).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).

(56) References Cited

OTHER PUBLICATIONS

PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Response dated Sep. 21, 2017 in U.S. Appl. No. 14/448,481, (44pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Vanderbilt University, "Free tax prep help available for Vanderbilt employees", Feb. 6, 2014, Vanderbilt University, p. 1-3 [NPL-1].
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).

(56) References Cited

OTHER PUBLICATIONS

Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items to a category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).

(56) References Cited

OTHER PUBLICATIONS

Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).

(56) References Cited

OTHER PUBLICATIONS

Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, 1 (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Communication pursuant to Rules 70(2) and 70a(2) EPC dated Apr. 25, 2018 in European Patent Application No. 16843282.1-1217, (1page).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).

\* cited by examiner

| | $Q_A$ | $Q_B$ | $Q_C$ | $Q_D$ | $Q_E$ | $Q_F$ | $Q_G$ | Goal |
|---|---|---|---|---|---|---|---|---|
| Rule 1 | Y | ? | N | ? | ? | ? | ? | Yes |
| Rule 2 | Y | ? | Y | ? | ? | ? | Y | Yes |
| Rule 3 | N | Y | ? | ? | Y | ? | Y | Yes |
| Rule 4 | N | Y | ? | ? | N | N | ? | Yes |
| Rule 5 | N | N | ? | N | ? | N | ? | Yes |

FIG. 4

| Data Field | Source ID (124) | Confidence Level (126) | Confirmed by Taxpayer (128) | Range (130) |
|---|---|---|---|---|
| Name: John Smith | 01 | H | Y | N/A |
| # Dependents: 3 | 03 | M | N | 0 - 5 |
| Filing Status: Married, Joint | 03 | H | Y | N/A |
| SSN: XXX-XX-1234 | 03 | H | Y | N/A |
| ⋮ | | | | |
| W-2: ACME Corp. | 05 | M | N | N/A |
| W-2 Gross Wages: $52,000.00 | 05 | M | N | $10,000 - $75,000 |
| Student Loan Int: $1,800.00 | 06 | L | N | $0 - $12,000 |

METHODS SYSTEMS AND ARTICLES OF MANUFACTURE FOR TAILORING A USER EXPERIENCE IN PREPARING AN ELECTRONIC TAX RETURN

SUMMARY

Embodiments of the present invention are directed to methods, systems and articles of manufacture for tailoring the user experience in preparing an electronic tax return using a tax return preparation application.

The embodiments of the present invention may be implemented on and/or within a tax return preparation system comprising a tax preparation software application executing on a computing device. The tax return preparation system may operate on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based on tax-related data that is input from a user, derived from sourced data, or estimated. A smart tax logic agent running on a set of rules can review current run time data and evaluate missing tax data necessary to prepare and complete a tax return. The tax logic agent proposes suggested questions to be asked to a user to fill in missing blanks. This process can be continued until completeness of all tax topics has occurred. A completed tax return (e.g., a printed tax return or an electronic tax return) can then be prepared and filed with respect to the relevant taxing jurisdictions.

In another aspect of the tax return preparation system, a computer-implemented method of calculating tax liability includes the operations of a computing device establishing a connection to a shared data store configured to store user-specific tax data therein. The computing device executes a tax calculation engine configured to read and write tax calculation data to and from the shared data store, the tax calculation engine using one or more of the calculation graphs specific to particular tax topics. The computing device executes a tax logic agent, the tax logic agent reading from the shared data store and a plurality of decision tables collectively representing a completion graph for computing tax liability or a portion thereof, the tax logic agent outputting one or more suggestions for missing tax data based on an entry in one of the plurality of decision tables. The computing device executes a user interface manager configured to receive the one or more suggestions and present to a user one or more questions based on the one or more suggestions via a user interface, wherein a user response to the one or more questions is input to the shared data store. The user interface manager is configured to generate and display a question screen to the user. The question screen includes a question for the user requesting tax data and is also configured to receive the tax data from the user in the form of input from the user. The user interface manager which receives the suggestion(s) selects one or more suggested questions to be presented to a user. Alternatively, the user interface manager may ignore the suggestion(s) and present a different question or prompt to the user.

In the event that all tax topics are covered, the tax logic agent, instead of outputting one or more suggestions for missing tax data may output a "done" instruction to the user interface manager. The computing device may then prepare a tax return based on the data in the shared data store. The tax return may be a conventional paper-based return or, alternatively, the tax return may be an electronic tax return which can then be e-filed.

The one or more suggestions may be tax topics, tax questions, declarative statements regarding the tax return, or confirmations regarding the tax return, referred to collectively as "tax matters," that are output by the tax logic agent. The one or more suggestions may include a ranked listing of suggestions. The ranking may be weighted in order of importance, relevancy, confidence level, or the like. Statistical data may be incorporated by the tax logic agent to be used as part of the ranking.

One embodiment of the present invention is directed to methods for determining the relevancy and prioritizing the suggested tax matters (as defined above, tax matters includes tax topics, tax questions, declarative statements regarding the tax return, or confirmations) output by the tax logic agent based on a taxpayer data profile generated by the tax return preparation system. In this way, the system can obtain the required tax data for the taxpayer in a more efficient and tailored fashion for the particular taxpayer. The tax return preparation system accesses taxpayer data comprising personal data and/or tax data regarding the taxpayer by any of the means described below, such as from prior year tax returns, third party databases, user inputs, etc. The system then generates a taxpayer data profile using the taxpayer data. For instance, the taxpayer data profile may include the taxpayer's age, occupation, place of residence, estimated income, etc.

The system executes the tax logic agent to evaluate missing tax data and to output a plurality of suggested tax matters for obtaining the missing tax data to the user interface manager, as described above. In addition, the tax logic agent utilizes the taxpayer data profile and a statistical/life knowledge module to determine a relevancy ranking for each of the suggested tax matter. For example, the relevancy ranking may be an index score, a binary value (such as relevant or not relevant), relative ranking among the suggested tax matters (e.g. from most relevant to least relevant), or other suitable relevancy ranking.

The statistical/life knowledge module comprises tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership. The tax correlation data also quantifies the correlations, such as by a probability of the correlation. For instance, for the example above, a 45 year old taxpayer may have a certain probability of homeownership, such as 60% probability of homeownership. The quantification can also be binary, such as relevant or not relevant. For example, if the taxpayer data profile indicates the taxpayer is married, the correlation may indicate that spouse information will be required.

The system then executes the user interface manager to receive the suggested tax matters and the relevancy ranking for the suggested tax matters. The user interface manager utilizes the relevancy ranking for each of the suggested tax matters to determine one or more tax questions for the suggested tax matters to present to the user, such as a first tax question. For example, if the relevancy ranking for a particular tax matter is very high, the user interface manager will select a tax question for that tax matter first. Then, the tax logic agent and user interface manager will iterate the process and progress with the tax matters having lower relevancy rankings.

In another aspect of the method for determining relevancy and prioritizing suggested tax matters during preparation of a tax return, the tax return preparation system updates the taxpayer data profile and relevancy rankings as more tax data regarding the taxpayer is received. Accordingly, the system presents the first tax question to the user and receives new tax data from the user in response to the first tax question. The system then updates the taxpayer data profile based on the new tax data and generates an updated taxpayer data profile. The system executes the tax logic agent to evaluate missing tax data and to output a second plurality of suggested tax matters to the user interface manager utilizing the updated taxpayer data profile and the statistical/life knowledge module to determine relevancy rankings for each of the second plurality of suggested tax matters. This process may be repeated until all required tax data has been received and the tax return is completed.

Accordingly, the method allows the system to tailor the user experience in preparing the electronic tax return to the tax situation of the particular taxpayer, providing a simpler, more straightforward and more efficient process.

Another embodiment of the present invention is directed to a method for generating the database of tax correlation data for the statistical/life knowledge module used for tailoring a user experience in preparing an electronic tax return using the computerized tax return preparation system. As described above, the tax correlation data comprises a plurality of tax matter correlations in which each tax matter correlation quantifies a correlation between a taxpayer attribute and a tax related aspect. The method effectively leverages available data regarding taxpayer attributes and tax related aspects, such as from previously filed tax returns and user experiences with tax preparation application, to determine the best tax questions and order of tax questions to present to a user in preparing a tax return using a tax return preparation application. In one embodiment, a computing device accesses a data source having a plurality of data records. Each data record comprises a taxpayer attribute and a tax related aspect for a respective taxpayer. The taxpayer attribute and tax related aspect may be as described above.

The computing device analyzes the plurality of data records and determines a correlation between the taxpayer attribute and the tax related aspect and determines a probability for the correlation. For instance, the correlation may be between the age of the taxpayer and having asked the taxpayer a certain tax question and the taxpayer's response, such as whether the taxpayer owned a home and receiving an affirmative or negative response. The system then utilizes the probability for the correlation to determine a quantitative relevancy score for a tax matter, which is then incorporated into the tax correlation data of the life/knowledge module. As described above, the tax correlation data is used by the tax logic agent in determining the one or more suggested tax matters and determining a relevancy ranking for each of the suggested tax matters.

In additional aspects of the method for generating the database of tax correlation data for the statistical/life knowledge module, the method may utilize a training algorithm to determine the correlation between the taxpayer attribute and the tax related aspect. The training algorithm learns as it analyzes the data records, and uses the learned knowledge in analyzing additional data records accessed by the computing device. The training algorithm also trains future versions of the tax return preparation application to alter the user experience by modifying the content of tax questions and order of tax questions presented to a user based on taxpayer correlations and the quantitative relevancy scores. In another aspect, the method utilizes a scoring algorithm to determine the quantitative relevancy score.

Still another embodiment of the present invention is directed to a method for facilitating ad hoc entry of tax data by a user using the tax return preparation system. By ad hoc entry of tax data, it is meant the entry of tax data not driven by a linear interview experience or in a pre-set order. The tax return preparation system simply receives an identification of a user-identified tax topic from the user. This may be the name of a tax document, such as "W-2", or a tax topic, such as "wages", and may be entered by the user in any suitable manner, such as a fillable input or search field, selectable button or link, etc. The system then executes the tax logic agent to determine one or more suggested tax matters based on the user-identified tax topic and outputs the suggested tax matters to the user interface manager. For instance, if the identification of a user-identified tax topic is "W-2" then the tax logic agent may determine and output a tax matter for W-2 income wages.

The user interface manager receives the suggested tax matters, and determines a first tax question for the suggested tax matter to present to the user based on the suggested tax matters. Since this is a user-identified tax matter, the tax logic agent may set a very high relevancy ranking for the suggested tax matters directly relevant to the user-identified tax topic.

In another aspect of the ad hoc method, the system may modify the relevancy value for one or more tax topics based on new tax data received from the user in response to the first tax question. This is similar to the update of the relevancy rankings described above. The system receives new tax data from the user in response to the first tax question. The system analyzes the new tax data and modifies a relevancy value for one or more tax topics based on the new tax data. The relevancy value indicates the relevancy of the tax topic to the particular taxpayer. The relevancy value may be a matter of degree, such as highly relevant, somewhat relevant, barely relevant, or it may be a quantitative score or index, or it may be a binary value such as relevant or not relevant. For example, if the first tax question is whether the taxpayer has a spouse, then the system may modify the relevancy of spouse information to be required tax data. The tax logic agent then utilizes the modified relevancy value of the one or more tax topics to determine one or more second suggested tax matters which are output to the user interface manager. The user interface manager receives the second suggested tax matters and determines a second tax question for the second suggested tax matters to present to the user. This process may be iteratively repeated as more tax data is input by the user and/or received by the system.

In another aspect of the tax return preparation system, the tax return preparation software running on the computing device imports tax data into the shared data store. The importation of tax data may come from one or more third party data sources. The imported tax data may also come from one or more prior year tax returns. In another aspect of the invention, the shared data store may be input with one or more estimates.

In still another feature, the tax return preparation system comprises a computer-implemented system for calculating tax liability. The system includes a computing device operably coupled to the shared data store which is configured to store user-specific tax data therein. The computing device executes a tax calculation engine. The tax calculation engine accesses taxpayer-specific tax data from the shared data store, and is configured to read and to read and write data to and from the shared data store. The tax calculation engine performs the tax calculations based on one or more tax calculation graphs. The tax calculation graph may be a single overall calculation graph for all of the tax calculations required to calculate a tax return, or it may comprise a plurality of tax topic calculation graphs specific to particular tax topics which may be compiled to form the overall tax calculation graph. The computing device executes a tax logic agent, the tax logic agent reading from the shared data store and a plurality of decision tables collectively representing a completion graph for computing tax liability or a portion thereof, the tax logic agent outputting one or more suggestions for missing tax data based on one of the plurality of decision tables. The computing device executes a user interface manager configured to receive the one or more suggestions and present to a user with one or more questions based on the one or more suggestions via a user interface, wherein a user response to the one or more questions is input to the shared data store.

Another embodiment of the present invention is directed to a system for generating the database of tax correlation data for the statistical/life knowledge module used for tailoring a user experience in preparing an electronic tax return using one or more of the described methods. The system includes or comprises a computing device having a computer processor and memory and a user experience tailoring software application executable by the computing device. The system may also include servers, data storage devices, and one or more displays. The system is configured and programmed to perform a process according to any of the method embodiments of the present invention for tailoring a user experience in preparing an electronic tax return. For instance, the system may be configured for: accessing a data source having a plurality of data records, each data record comprising a taxpayer attribute and a tax related aspect for a respective taxpayer; analyzing the plurality of data records and determining a correlation between the taxpayer attribute and the tax related aspect, and determining a probability for the correlation; and utilizing the probability for the correlation to determine a quantitative relevancy score for a tax matter comprising one of a tax question or a tax topic, wherein the quantitative relevancy score is for use by a tax logic agent of the computerized tax preparation system in determining one or more suggestions for obtaining missing tax data required for preparing a tax return.

In addition, the system for generating the database of tax correlation data may be implemented on a computing system operated by the user or an online application operating on a web server and accessible using a computing device via a communications network such as the internet.

In additional aspects, the system for generating a database of tax correlation data for tailoring a user experience may be further configured according to the additional aspects described above for the methods for generating a database of tax correlation data.

Another embodiment of the present invention is directed to an article of manufacture comprising a non-transitory computer readable medium embodying instructions executable by a computer to execute a process according to any of the method embodiments of the present invention for generating the database of tax correlation data for the statistical/life knowledge module used for tailoring a user experience in preparing an electronic tax return using one or more of the described methods. For instance, the non-transitory computer readable medium embodying instructions executable by a computer may be configured to execute a process comprising: accessing a data source having a plurality of data records, each data record comprising a taxpayer attribute and a tax related aspect for a respective taxpayer; analyzing the plurality of data records and determining a correlation between the taxpayer attribute and the tax related aspect, and determining a probability for the correlation; and utilizing the probability for the correlation to determine a quantitative relevancy score for a tax matter comprising one of a tax question or a tax topic, wherein the quantitative relevancy score is for use by a tax logic agent of the computerized tax preparation system in determining one or more suggestions for obtaining missing tax data required for preparing a tax return.

In additional aspects, the article of manufacture may be further configured according to the additional aspects described above for the methods for generating a database of tax correlation data for tailoring a user experience.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

FIG. 4 illustrates a decision table based on or derived from the completeness graph of FIG. 3.

FIG. 9 illustrates components of a computing device that may be utilized to execute software method of tagging tax-related events.

DETAILED DESCRIPTION OF ILLUSTRATED EMBODIMENTS

Figure 1:
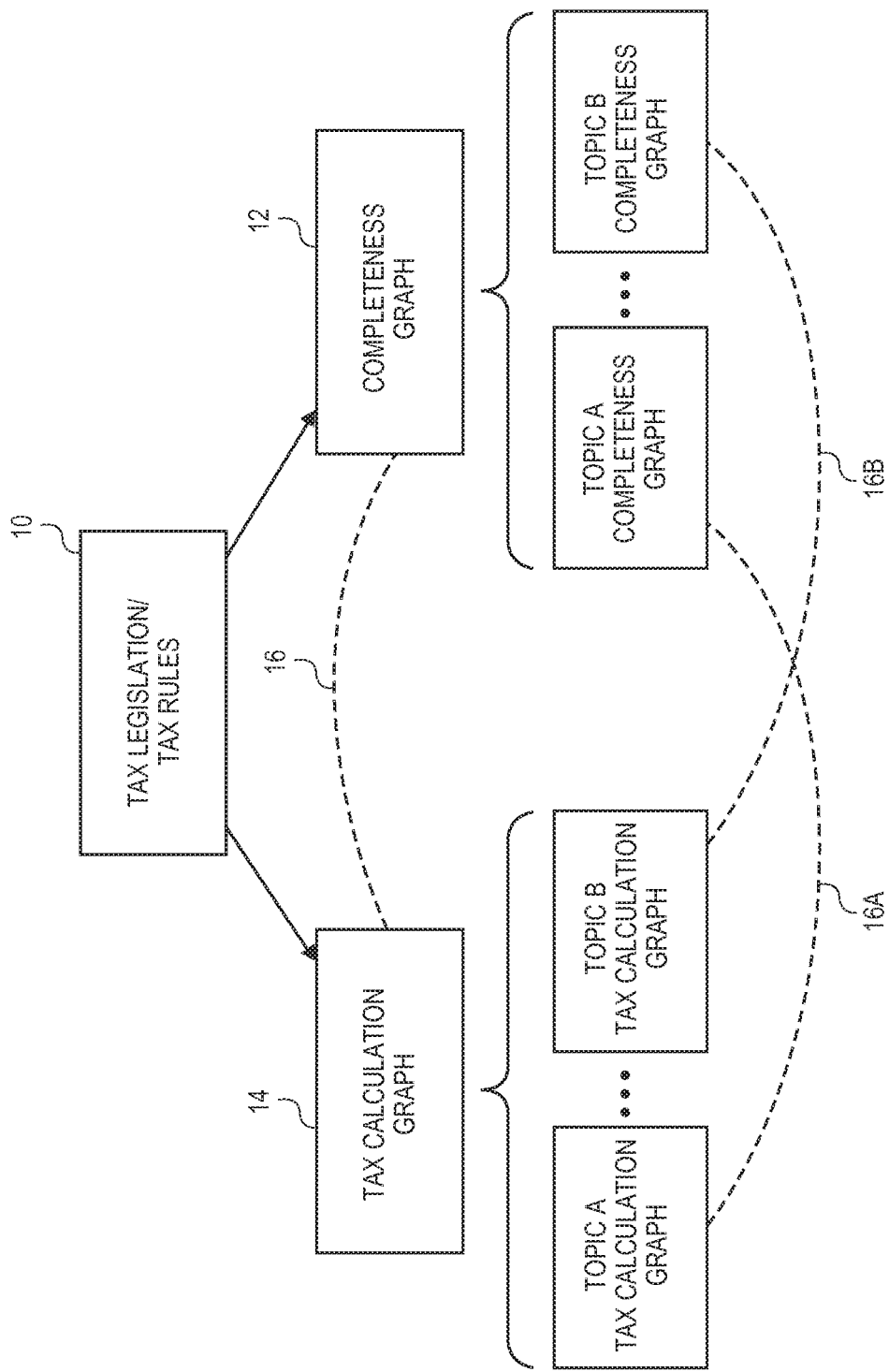
FIG. 1 schematically illustrates how tax legislation/tax rules is parsed and represented by a completeness graph and a tax calculation graph.

Embodiments of the present invention are directed to methods, systems and articles of manufacture for a method for generating a database of tax correlation data for a statistical/life knowledge module used for tailoring a user experience in preparing an electronic tax return using a computerized tax return preparation system. The tax correlation data comprises a plurality of tax matter correlations in which each tax matter correlation quantifies a correlation between a taxpayer attribute and a tax related aspect. A computing device accesses a data source having a plurality of data records. Each data record comprises a taxpayer attribute and a tax related aspect for a respective taxpayer. The computing device analyzes the plurality of data records and determines a correlation between the taxpayer attribute and the tax related aspect and determines a probability for the correlation. The computing device utilizes the probability for the correlation to determine a quantitative relevancy score for a tax matter, which can be incorporated into the tax correlation data of the life/knowledge module. The tax correlation data may be used by the tax logic agent in determining one or more suggested tax matters and determining a relevancy ranking for each of the suggested tax matters.

Tax preparation is a time-consuming and laborious process. It is estimated that individuals and businesses spend around 6.1 billion hours per year complying with the filing requirements of the Internal Revenue Code. Tax return preparation software has been commercially available to assist taxpayers in preparing their tax returns. Tax return preparation software is typically run on a computing device such as a computer, laptop, tablet, or mobile computing device such as a Smartphone. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, the current invention provides tax preparation software 100 that may run on computing devices 102 that operate on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. Individual combinations of completeness graphs 12 and tax calculation graphs 14 that relate to one or more topics can be used complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI).

Figure 2:
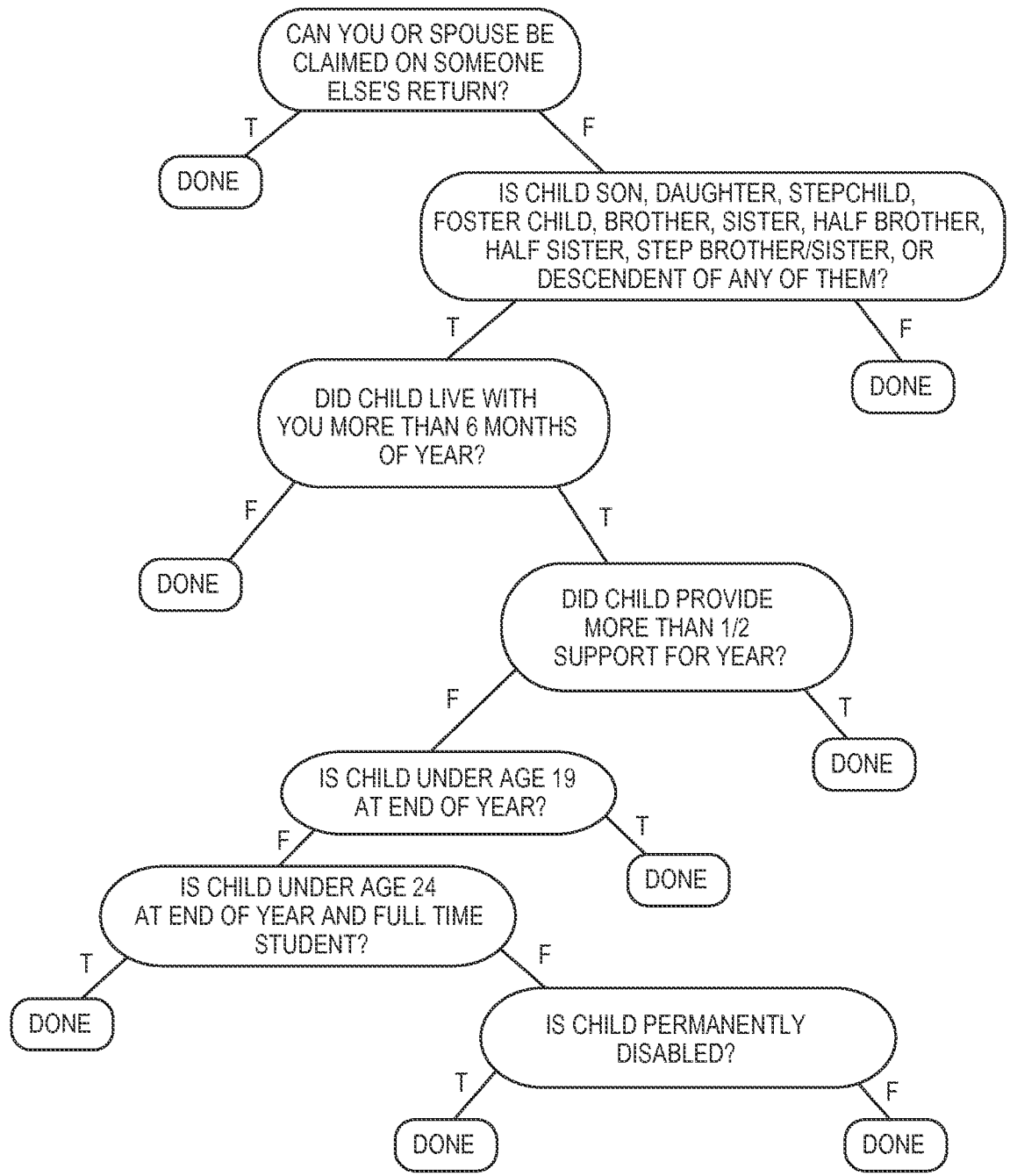
FIG. 2 illustrates an example of a simplified version of a completeness graph related to a qualifying child for purposes of determining deductions for federal income tax purposes.

The completeness graph 12 and the tax calculation graph 14 represent data structures that can be constructed in the form of tree. FIG. 2 illustrates a completeness graph 12 in the form of a tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, by many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 3:
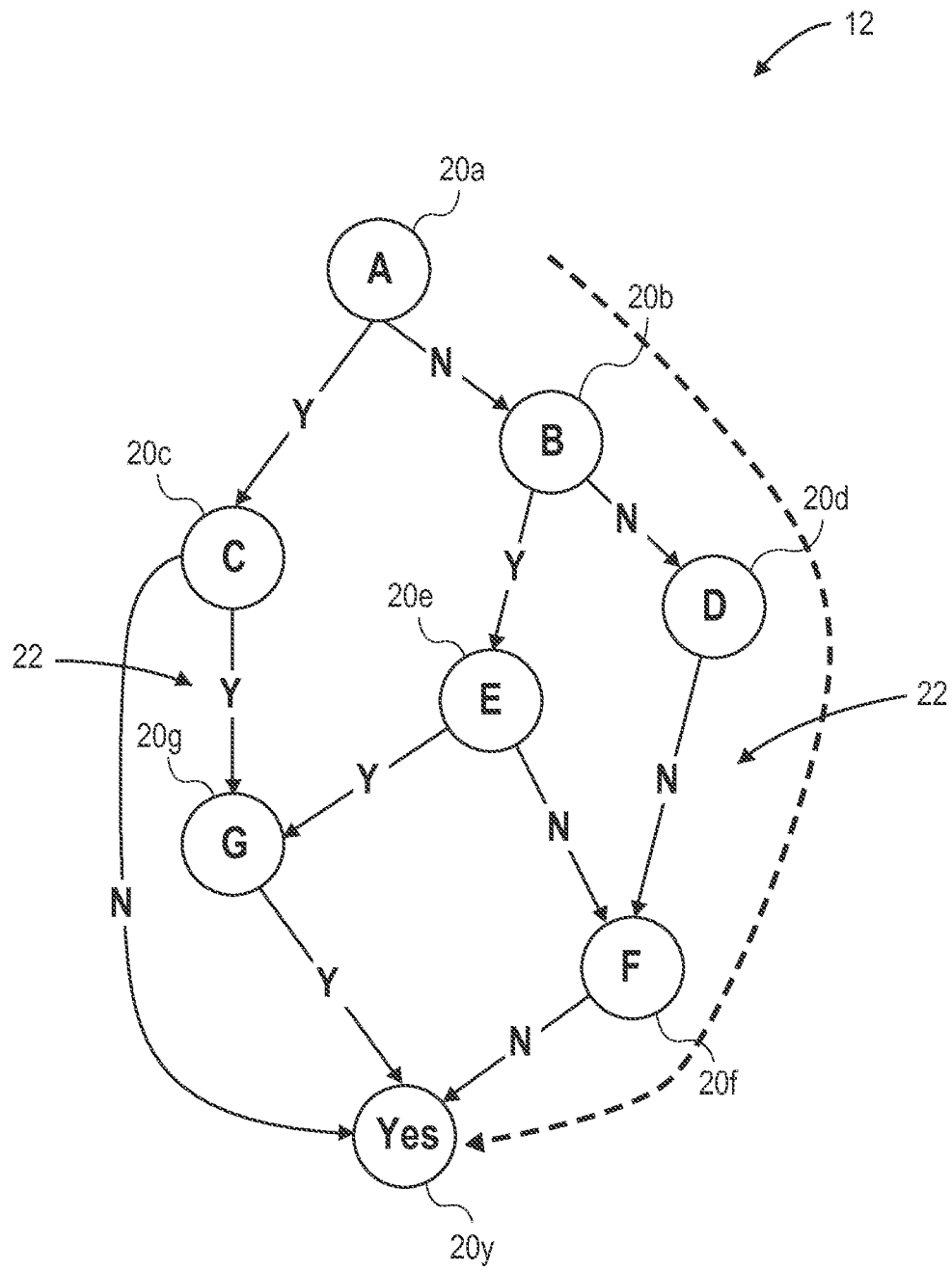
FIG. 3 illustrates another illustration of a completeness graph.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

Figure 5:
FIG. 5 illustrates another embodiment of a decision table that incorporates statistical data.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 6:
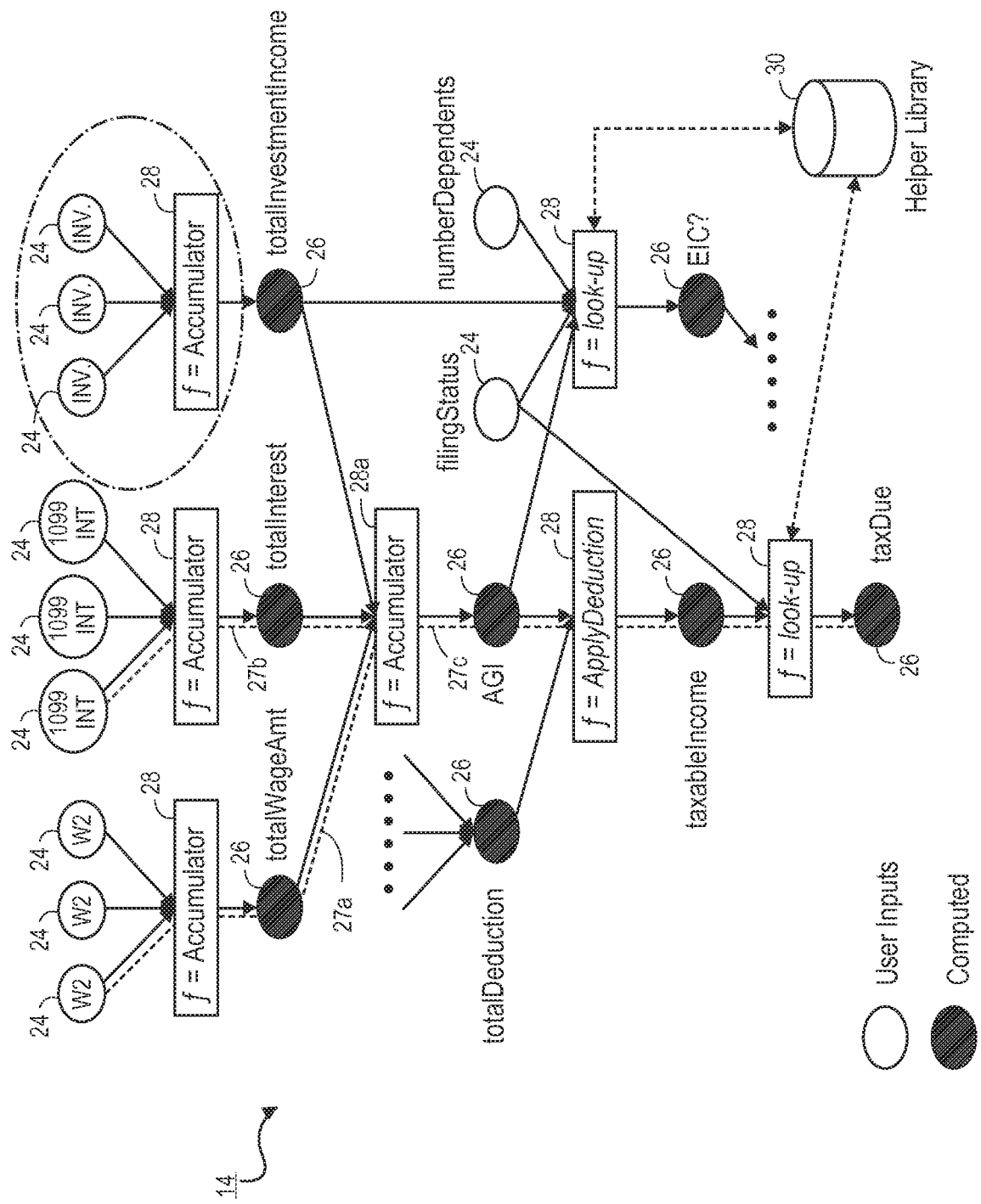
FIG. 6 illustrates an example of a calculation graph according to one embodiment.

FIG. 6 illustrates an example of a tax calculation graph 14. The tax calculation graph semantically describes the tax legislation/tax rules 10. In FIG. 6, various nodes 24 are leaf or input nodes. Examples of leaf nodes 24 in this particular example include data obtained from W-2 forms, data obtained from 1099-INT forms, data obtained from other investment income, filing status, and number of dependents. Typically, though not exclusively, leaf nodes 24 are populated with user inputs. That is to say the user taxpayer will enter this information from a user interface. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, potential dependents, address, and social security number) which can then be used to populate the leaf nodes 24. Online resources such as financial services websites or other user-specific websites can be crawled and scanned to scrap or otherwise download tax related information that can be automatically populated into leaf nodes 24. Additional third party information sources such as credit bureaus, government databases, and the like can also be used by the tax preparation software 100 to obtain information that can then be populated in to respective leaf nodes 24. In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes 26 semantically represent a tax concept and may be calculated using a function node 28. Some or all of these internal nodes 26 may be labeled as "tax concepts." Interconnected nodes 26 containing tax concepts may be connected via "gist" functions that can be tagged and later be used or called upon to explain to the user the reasoning behind why a particular result was calculated or determined by the tax preparation software 100 program as explained in more detail below. Gists are well-defined functions to capture domain specific patterns and semantic abstractions used in tax calculations. Gists can be decoupled from a specific narrow definition and instead be associated with one or more explanation. Examples of common "gists" found in tax legislation/rules include the concepts of "caps" or "exceptions" that are found in various portions of the tax code. The function node 28 may include any number of mathematical or other operations. Examples of functions 28 include summation, subtraction, multiplication, division, and look-ups of tables or values from a database 30 or library as is illustrated in FIG. 6. It should be understood that nodes within completion graph 12 and the tax calculation graph 14 may be shared in some instances. For example, AGI is a re-occurring tax concept that occurs in many places in the tax code. AGI is used not only for the mathematical computation of taxes is also used, for example, to determine eligibility of certain tax deductions and credits. Thus, the AGI node is common to both the completion graph 12 and the tax calculation graph 14.

The calculation graph 14 also has a plurality of calculation paths connecting the nodes 24, 26 and 28, which define data dependencies between the nodes. A second node is considered to be dependent on a first node if a calculation (calculation includes any determination within the calculation graph, such as function, decisions, etc.) at the second node depends on a value of the first node. A second node has a direct dependency on the first node if it is directly dependent on the first node without any intervening nodes. A second node has an indirect dependency on the first node if it is dependent on a node which is directly dependent on the first node or an intervening node along a calculation path to the first node. Although there are many more calculation paths in the calculation graph 14 of FIG. 6, FIG. 6 shows two exemplary calculation paths 27*a* and 27*b*, which interconnect nodes having data dependencies. Some or all of the data dependencies may be gists, as described above. The two calculation paths 27*a* and 27*b* intersect at the "accumulator" 28*a*, and are thereafter coincident as calculation path 27*c*.

Figure 7:
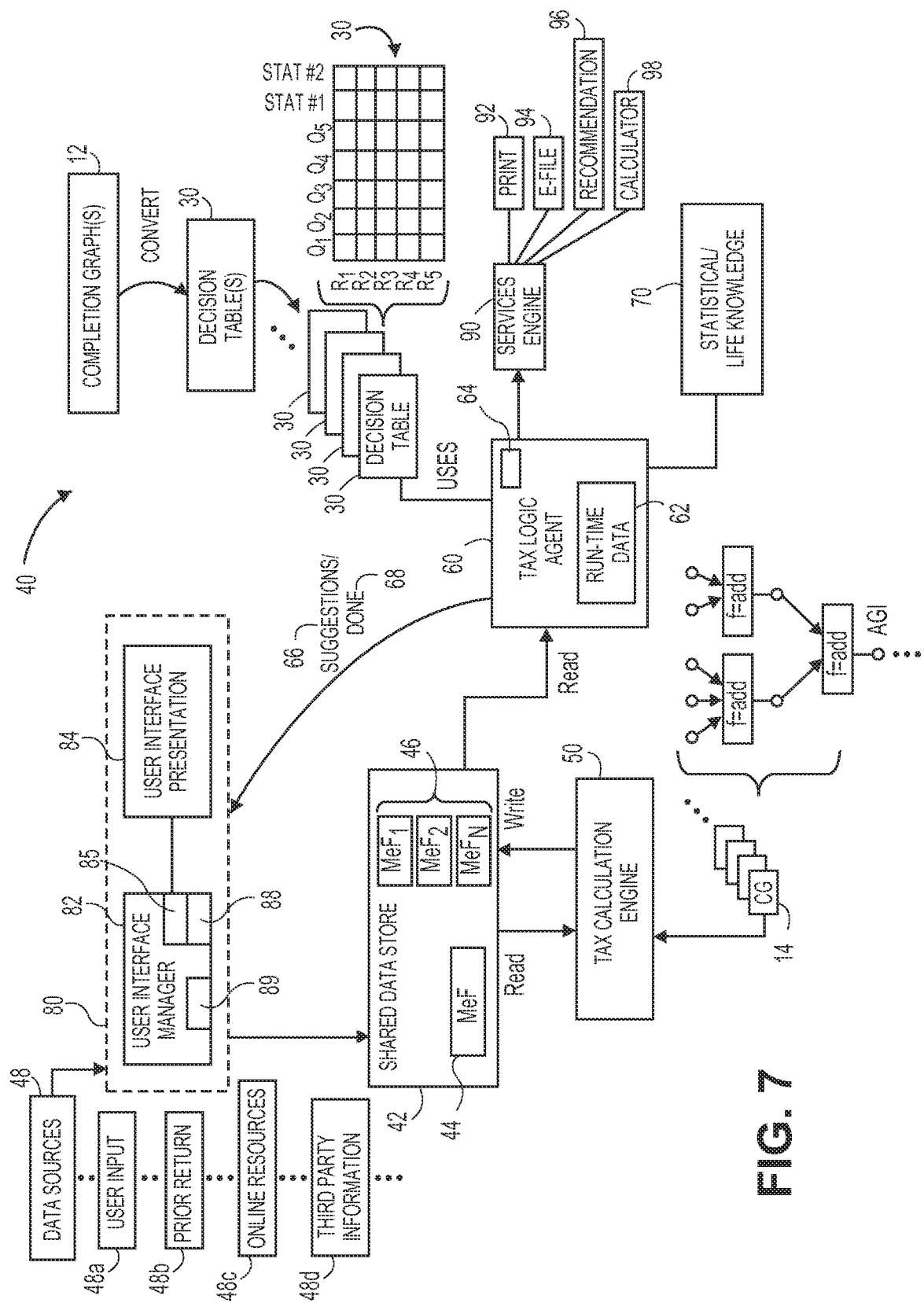
FIG. 7 schematically illustrates a system for calculating taxes using rules and calculations based on declarative data structures.

FIG. 7 schematically illustrates a tax return preparation system 40 for calculating taxes using rules and calculations based on declarative data structures according to one embodiment. The system 40 include a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein. The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version (designated MeF++) of the MeF model established by government authorities. While the particular MeF schema 44 is discussed herein the invention is not so limited. There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 7 illustrates several instances 46 of the MeF schema 44 (labeled as $MeF_1$, $MeF_2$, $MeF_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits.

For example, user input 48a is one type of data source 48. User input 48a may take a number of different forms. For example, user input 48a may be generated by a user using, for example, a input device such as keyboard, mouse, touchscreen display, voice input (e.g., voice to text feature) or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48b to be searched but not online resources 48c. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. The user may also be given the option of whether or not to import the data from the data sources 48.

User input 48a may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48b. A prior year tax return 48b that is stored electronically can be searched and data is copied and transferred to the shared data store 42. The prior year tax return 48b may be in a proprietary format (e.g., .txf, .pdf) or an open source format. The prior year tax return 48b may also be in a paper or hardcopy format that can be scanned or imaged whereby data is extracted and transferred to the shared data store 42. In another embodiment, a prior year tax return 48b may be obtained by accessing a government database (e.g., IRS records).

An additional example of a data source 48 is an online resource 48c. An online resource 48c may include, for example, websites for the taxpayer(s) that contain tax-related information. For example, financial service providers such as banks, credit unions, brokerages, investment advisors typically provide online access for their customers to view holdings, balances, transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?". Additional follow-up questions can then be presented to the user.

Still referring to FIG. 7, another data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48d include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities.

Still referring to FIG. 7, the tax return preparation software 100 executed by the computing device 102, 103 includes a tax calculation engine 50 that computes one or more tax calculations based on the tax calculation graph(s) 14 and the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1 and 6. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation).

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form a Drools expert engine. Other declarative rules engines 64 may be utilized and a Drools expert rule engine 64 is provided as one example of how embodiments may be implemented. The TLA 60 may be implemented as a dedicated module contained within the tax preparation software 100.

As seen in FIG. 7, The TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, in which case, as explained in more detail below, the UI control 80 presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing or compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules: Rule engine (64)/Tax Logic Agent (TLA) (60)
// initialization process
Load_Tax_Knowledge_Base;
Create_Fact_Cache; While (new_data_from_application)
Insert_data_into_fact_cache;
   collection=Execute_Tax_Rules; // collection is all the fired rules and corresponding conditions
   suggestions=Generate_suggestions (collection);
send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(b) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer. A method 1450 for generating a database of tax correlation data for the statistical/life knowledge module 70 is described below with respect to FIG. 17.

Figure 16:
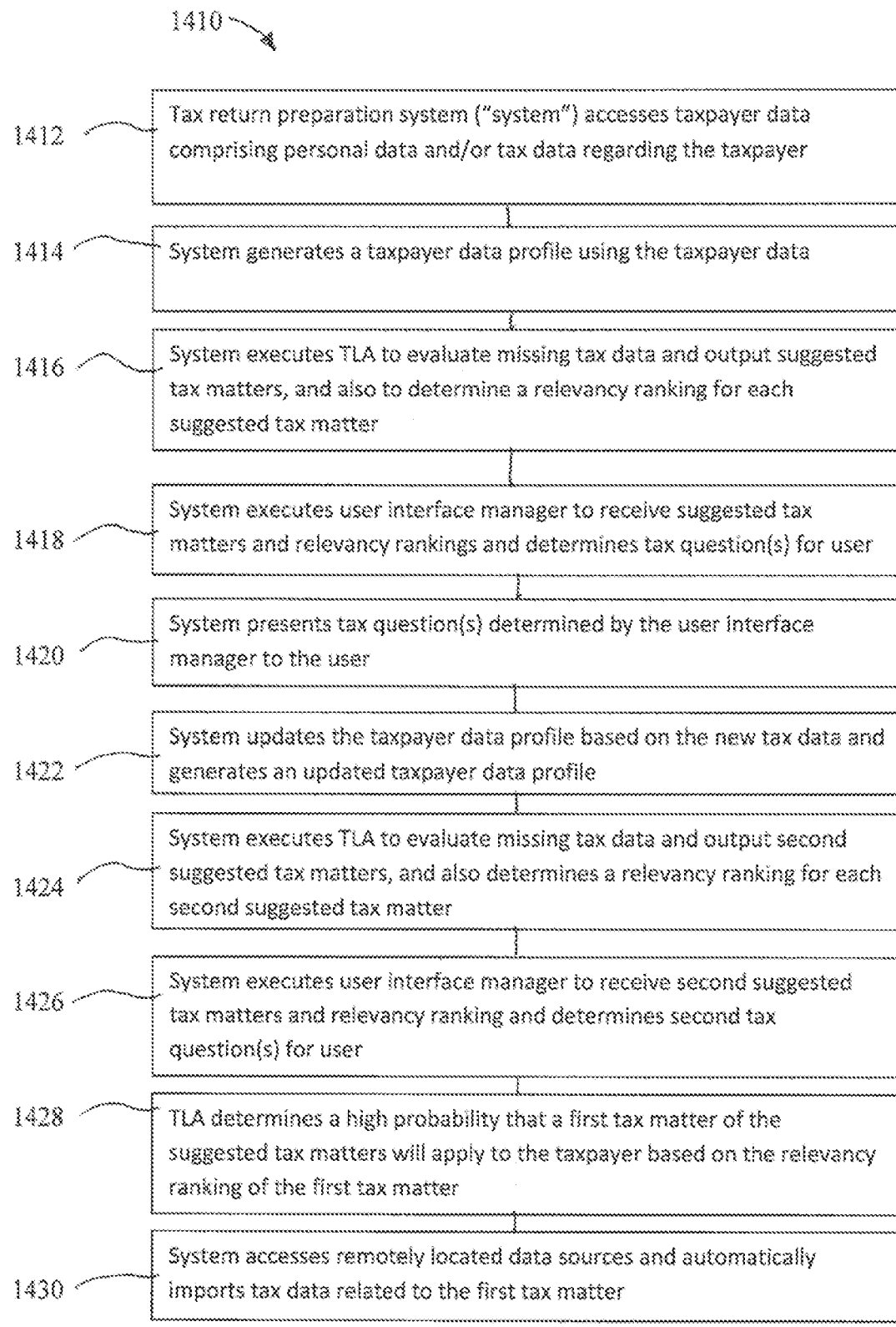
FIG. 16 illustrates a flowchart of operations used in connection with a method of prioritizing tax topics personalized to a taxpayer according to one embodiment.

Turning now to FIG. 16, a method for utilizing the statistic/life knowledge module 70 and the TLA 60 to prioritize tax matters in order to personalize the user experience to the particular taxpayer is illustrated. As defined above, tax matters includes tax topics, tax questions, declarative statements regarding the tax return, or confirmations. At step 1412, the tax return preparation system accesses taxpayer data comprising personal data and/or tax data regarding the taxpayer for which the tax return is being prepared. This taxpayer data may be accessed by any suitable method, including the method described for accessing the data sources 48, as described above.

At step 1414, the system 40 uses the taxpayer data to generate a taxpayer data profile. As some examples, the taxpayer data profile may include the taxpayer's age, occupation, place of residence, estimated income, actual income from prior tax returns, more general geographical location, marital status, investment information, etc.

At step 1416, the system 40 executes the TLA 60 to evaluate missing tax data and to output a plurality of suggested tax matters 66 for obtaining the missing tax data to the user interface manager 82, as described in more detail above. At the same time, the TLA 60 utilizes the taxpayer data profile and the statistical/life knowledge module 70 to determine a relevancy ranking for each of the suggested tax matters. The relevancy ranking is an indication of the relative relevancy of each suggested tax matter to other tax matters within the suggested tax matters or even other tax matters not in the suggested tax matters. The relevancy ranking may be an index score, a binary value (such as relevant or not relevant), relative ranking among the suggested tax matters (e.g. from most relevant to least relevant), or other suitable relevancy ranking.

At step 1418, the system 40 executes the user interface manager 82 to receive the suggested tax matters and the relevancy ranking for the suggested tax matters. The user interface manager 82 analyzes the relevancy ranking for each of the suggested tax matters and determines one or more tax questions for the suggested tax matters to present to the user, which includes at least a first tax question. The relevancy ranking has a direct influence on the tax questions that the user interface manager 82 will determine to present because a suggested tax matter having a high relevancy ranking, or at least higher than the relevancy ranking of the other suggested tax matters, will have priority in determining the tax questions. In other words, if a tax matter having a high relevancy ranking is very high, the user interface manager will select one or more tax questions for that tax matter first.

The system 40 may repeat steps 1416-1418 iteratively until all of the required tax data for preparing the tax return has been received by the system 40.

In another aspect of the method 1400, the tax return preparation system 40 updates the taxpayer data profile and relevancy rankings as more tax data regarding the taxpayer is received. At step 1420 the system presents the one or more tax questions determined by the user interface manager 82 at step 1418 and receives new tax data from the user in response to the one or more tax questions. At step 1422, the system 40 updates the taxpayer data profile based on the new tax data and generates an updated taxpayer data profile. At step 1424, the system 40 executes the TLA 60 to evaluate missing tax data and to output a second plurality of suggested tax matters to the user interface manager 82 utilizing the updated taxpayer data profile and the statistical/life knowledge module and determines relevancy rankings for each of the second plurality of suggested tax matters. At step 1426, the system 40 executes the user interface manager 82 to receive the second plurality of suggested tax matters and to determine one or more second tax question(s) to present to the user. Similar to the sub-process of steps 1416-1418, above, the process of steps 1418 to 1426 until all required tax data has been received and the tax return is completed.

In yet another optional aspect of the method 1400, the method may be configured to automatically access a remotely located third party data source to access tax data for a tax matter. At step 1428, the TLA 60 determines a high probability that a first tax matter of the suggested tax matters (or second suggested tax matters, or subsequent suggested tax matters) will apply to the taxpayer based on the relevancy ranking of the first tax matter. The term "first tax matter" does not necessarily refer to the first tax matter suggested by the TLA 60, but only distinguishes it from other suggested tax matters. A high probability may be at least a 60% probability, at least a 70% probability, at least a 80% probability, at least a 90% probability or a 100% certainty or other suitable probability which indicates it would be desirable to access the data from a remote data source, if possible. At step 1430, the system 40 accesses one or more remotely located user-specific data sources and automatically imports tax data related to the first tax matter from the user-specific data sources. The data sources may be any of the data sources 48 described herein and the system 40 may access the data sources by any of the methods described herein for accessing remotely located data sources, including those described above for gathering tax related data from remote data sources. As the system 40 receives new tax data from the remote user-specific data sources, the system 40 may also update the relevancy rankings as described above and modify relevancy values and/or relevancy rankings for one or more tax topics based on the new tax data. The TLA 60 may then use the modified relevancy values and/or relevancy rankings to determine one or more new suggested tax matters and output the new suggested tax matters to the user interface manager 82. The user interface manager 82 then determines one or more additional tax questions for the new suggested tax matters to present to the user based on the new suggested tax matters.

Figure 17:
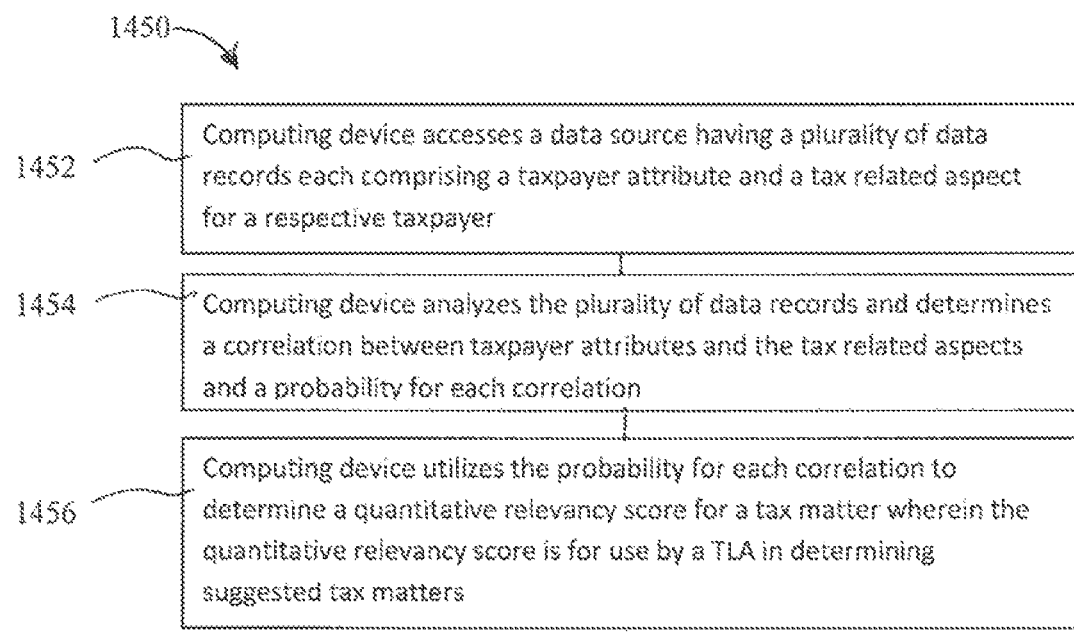
FIG. 17 illustrates a flowchart of operations used in connection with a method for generating a database of tax correlation data for a statistical/life knowledge module used for tailoring the user experience in preparing an electronic tax return according to one embodiment.

Referring now to FIG. 17, a method 1450 for generating a database of tax correlation data for the statistical/life knowledge module 70 which can be used to tailoring the user experience, including the method 1410, is illustrated. The method 1450 may be performed by the tax return preparation system 40 as described herein, or it may be performed by a separate system, such as a tax correlation database system comprising a computing device, such as a computing device 102 as described below, and a user experience tailoring software application that is separate from a tax return preparation software application. As a separate system, the tax correlation database system for generating the database may transfer the database to the tax return preparation system 40, or the tax return preparation system 40 may simply access the needed data from the system.

At step 1452, the computing device 102 accesses a data source having a plurality of data records. The data source may be any suitable source of data regarding taxpayer attributes and tax related aspects which can be analyzed to find correlations between taxpayer attributes and tax related aspects. As some examples, the data source may be any of the data sources 48 described above, such as a database of previously filed tax returns having data records comprising tax data from previously filed tax returns, a database of financial account data comprising data records of financial data, a database of social media account data comprising data records of personal information, etc. The data source may also be a database of previous user experiences in utilizing a tax return preparation application. The data records for such a database may include what questions were asked of certain taxpayers and the effectiveness of asking such questions (such as whether the questions resulted in obtaining relevant tax data for the taxpayer). Each data record in the data source comprises a taxpayer attribute and a tax related aspect for a respective taxpayer, individual or entity. The taxpayer attribute and tax related aspect may be as described above for method 1410.

At step 1454, the computing device 102 analyzes the plurality of data records and determines a correlation between each of the taxpayer attributes and at least one of the tax related aspects and determines a probability for the correlation. The computing device 102 may determine multiple correlations for any one taxpayer attribute or any one tax related aspect, depending on the situation. As some non-limiting examples of possible correlations, the correlations may be:

1. A correlation between the age of the taxpayer and having asked the taxpayer a certain tax question and the taxpayer's response, such as whether the taxpayer owned a home and receiving an affirmative or negative response.
2. A correlation between taxpayer age and homeownership;
3. A correlation between taxpayer address and homeownership;
4. A correlation between taxpayer employment and homeownership;
5. A correlation between taxpayer age and having dependents;
6. A correlation between taxpayer married status and need for spouse tax information;
7. A correlation between taxpayer income and affordable care act information;
8. A correlation between taxpayer income and charitable deductions;
9. A correlation between taxpayer age and social security benefits; and
10. A correlation between income and stock investment information.

This list of examples of correlations is not limiting of the present invention, and many other correlations are contemplated.

The computing device may utilize a training algorithm to determine the correlations between the taxpayer attributes and the tax related aspects. The training algorithm is configured to learn as it analyzes various data sources and data records, and uses the learned knowledge in analyzing additional data records accessed by the computing device. The training algorithm may also trains future versions of a tax return preparation application to alter the user experience by modifying the content of tax questions and order of tax questions presented to a user based on the determined correlations and the quantitative relevancy scores.

At step 1456, the computing device 102 utilizes the probability for each of the correlations to determine a quantitative relevancy score for a respective tax matter. The computing device 102 utilizes a scoring algorithm to determine the quantitative relevancy score. The scoring algorithm is configured to convert the probability determined for each correlation into a quantitative relevancy score which can be utilized by the TLA 60 to determine one or more suggested tax matters and also determine a relevancy ranking for each of the suggested tax matters which can in turn be utilized by the user interface manager 82 to determine one or more tax questions to present to the user. In other words, the quantitative relevancy score allows the system 40 to determine the relative relevancy of various tax matters in order to most efficiently present tax questions to the user in a way that minimizes the time and effort required to complete a tax return.

The quantitative relevancy score for each of the tax matters may then be incorporated into the tax correlation data of the life/knowledge module, if desired. As explained above, the tax correlation data is used by the TLA 60 agent in determining the one or more suggested tax matters and determining a relevancy ranking for each of the suggested tax matters.

Figure 18:
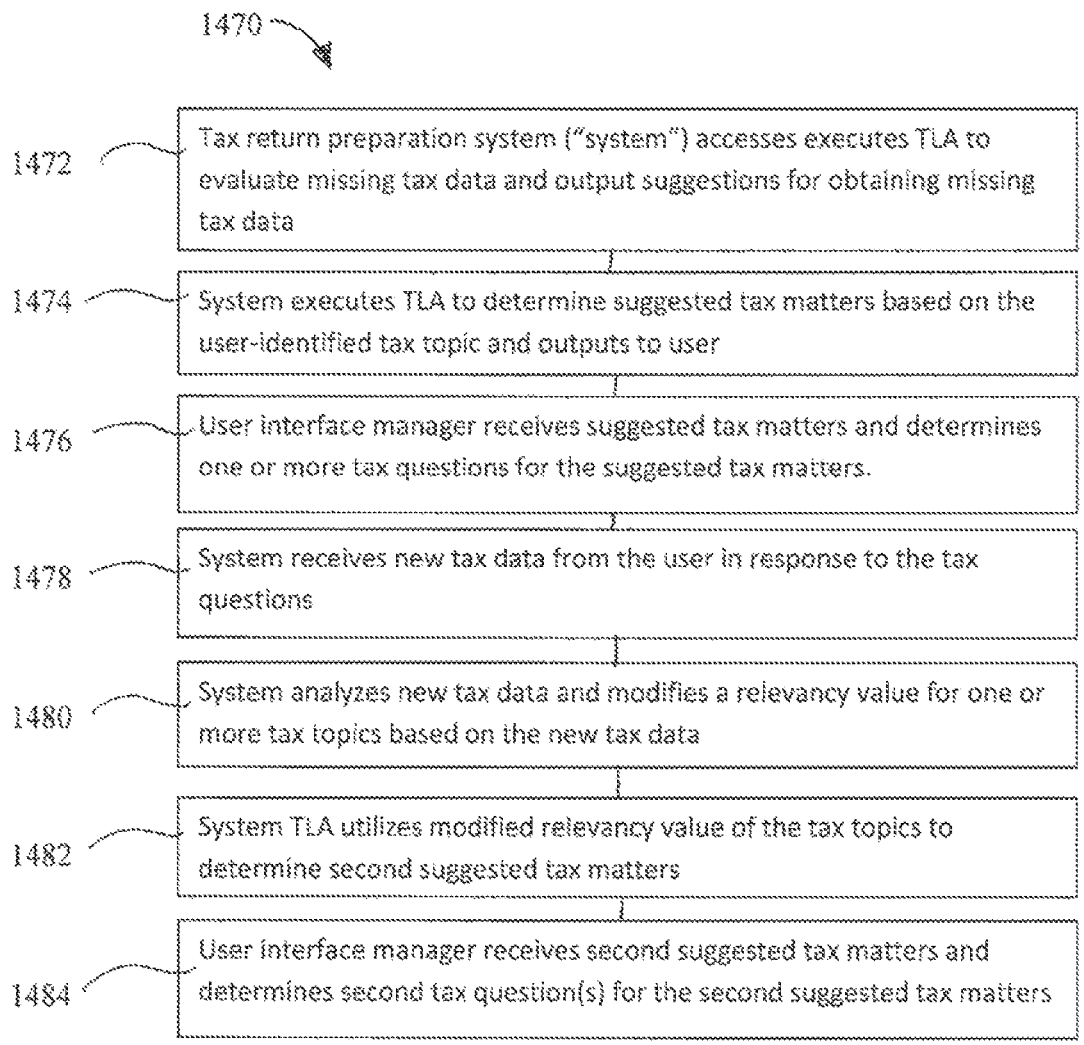
FIG. 18 illustrates a flowchart of operations used in connection with a method of allowing a user to enter tax data in an ad hoc fashion according to one embodiment.

Turning now to FIG. 18, a method 1470 for facilitating the ad hoc entry of tax by a user using the tax return preparation system 40 is shown. Ad hoc entry of tax data means allowing the user to enter tax data based on receiving identification of a user's intentions or choice of a particular tax topic, such as entry of data for a particular tax form identified by the user, or preferred tax topic the user wants to work on, as opposed to following a linear interview experience, or other predetermined order of tax topics and/or data entry. At step 1472, the tax return preparation system 40 receives an identification of a user-identified tax topic from the user. The identification may be the name of a tax document, such as "W-2", or a tax topic, such as "wages". The identification may be entered by the user in any suitable manner, such as a fillable input or search field, selectable button or link, etc. At step 1474, the system 40 executes the TLA 60 to determine one or more suggested tax matters based on the user-identified tax topic and outputs the suggested tax matters to the user interface manager 82. As an example, if the identification of a user-identified tax topic is "W-2" then the TLA 60 may determine and output a tax matter for W-2 income wages.

At step 1476, the user interface manager 82 receives the suggested tax matters, and determines one or more tax questions for the suggested tax matter to present to the user based on the suggested tax matters. The TLA 60 may also determine relevancy rankings and the user interface manager may use the relevancy rankings, as described above for method 1400. As this is a user-identified tax matter, the TLA 60 may set a very high relevancy ranking for the suggested tax matters directly relevant to the user-identified tax topic.

In another aspect of the method 1470, the system 40 may modify the relevancy value for one or more tax topics based on new tax data received from the user in response to the first tax question. This is similar to the update of the relevancy rankings described above. At step 1478, the system 40 receives new tax data from the user in response to the one or more tax questions. At step 1480, the system 40 analyzes the new tax data and modifies a relevancy value for one or more tax topics based on the new tax data. The relevancy value indicates the relevancy of the tax topic to the particular taxpayer. The relevancy value may be a matter of degree, such as highly relevant, somewhat relevant, barely relevant, or it may be a quantitative score or index, or it may be a binary value such as relevant or not relevant. For example, if one of the tax questions is whether the taxpayer has a spouse, then the system 40 may modify the relevancy of spouse information to be required tax data. At step 1482, the TLA 60 then utilizes the modified relevancy value of the one or more tax topics to determine one or more second suggested tax matters which are output to the user interface manager. At step 1484, the user interface manager 82 receives the second suggested tax matters and determines a second tax question for the second suggested tax matters to present to the user. This process is repeated as more tax data is input by the user and/or received by the system 40, until the tax return is completed.

Figure 13:
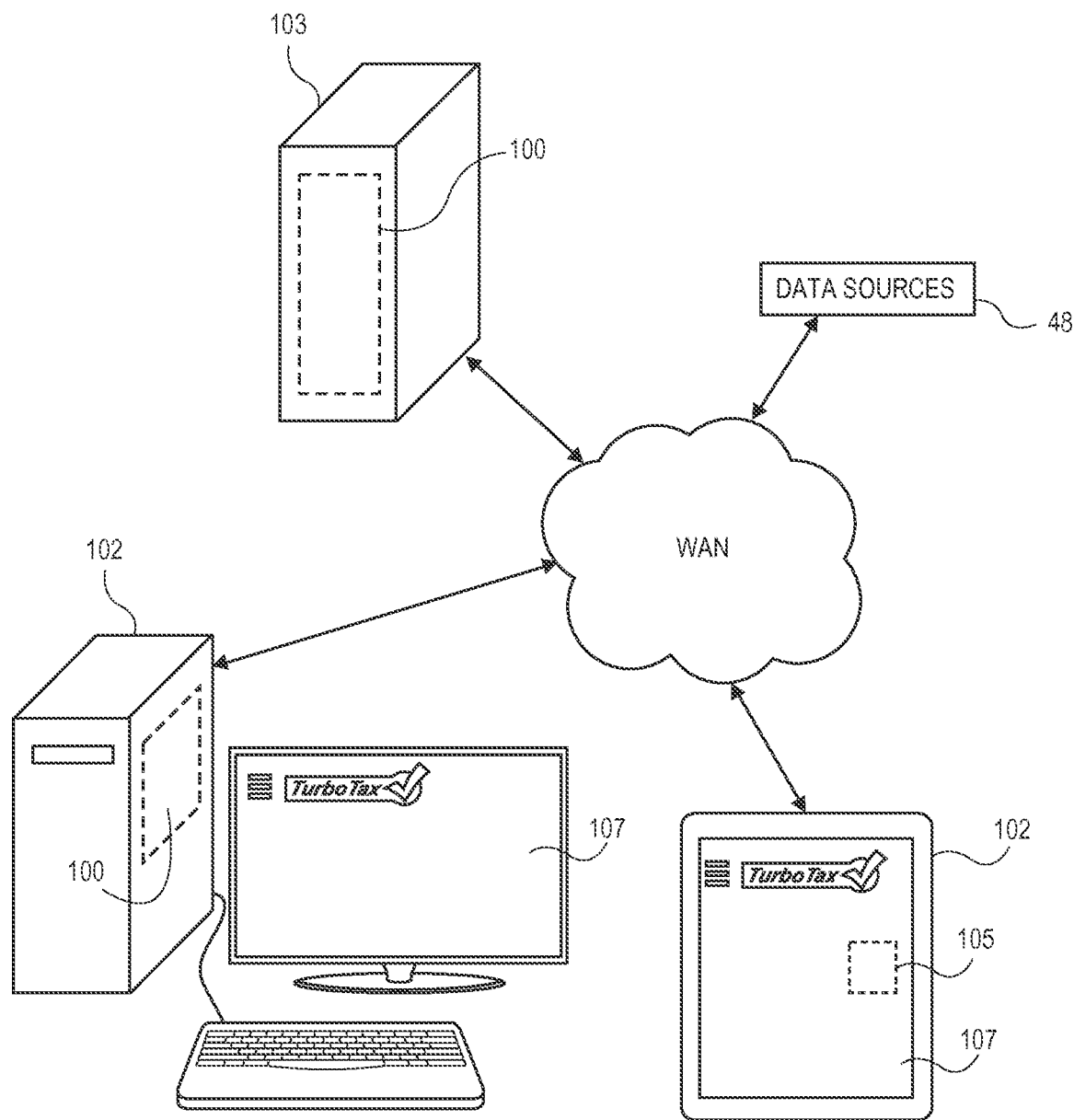
FIG. 13 illustrates the implementation of tax preparation software on various computing devices.

Referring back to FIG. 7, the UI controller 80 encompasses a user interface manager 82 and a user interface presentation or user interface 84. The user interface presentation 84 is controlled by the interface manager 82 may manifest itself, typically, on a visual screen or display 104 that is presented on a computing device 102 (seen, for example, in FIG. 13). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may be pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested of the taxpayer. For example, with regard to donated goods, the taxpayer may be prompted to explain what the donated goods are and describe the same in sufficient detail to satisfy requirements set by a particular taxing authority.

Still referring to FIG. 7, the TLA 60 is operatively coupled to a services engine 90 that is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

Figure 8:
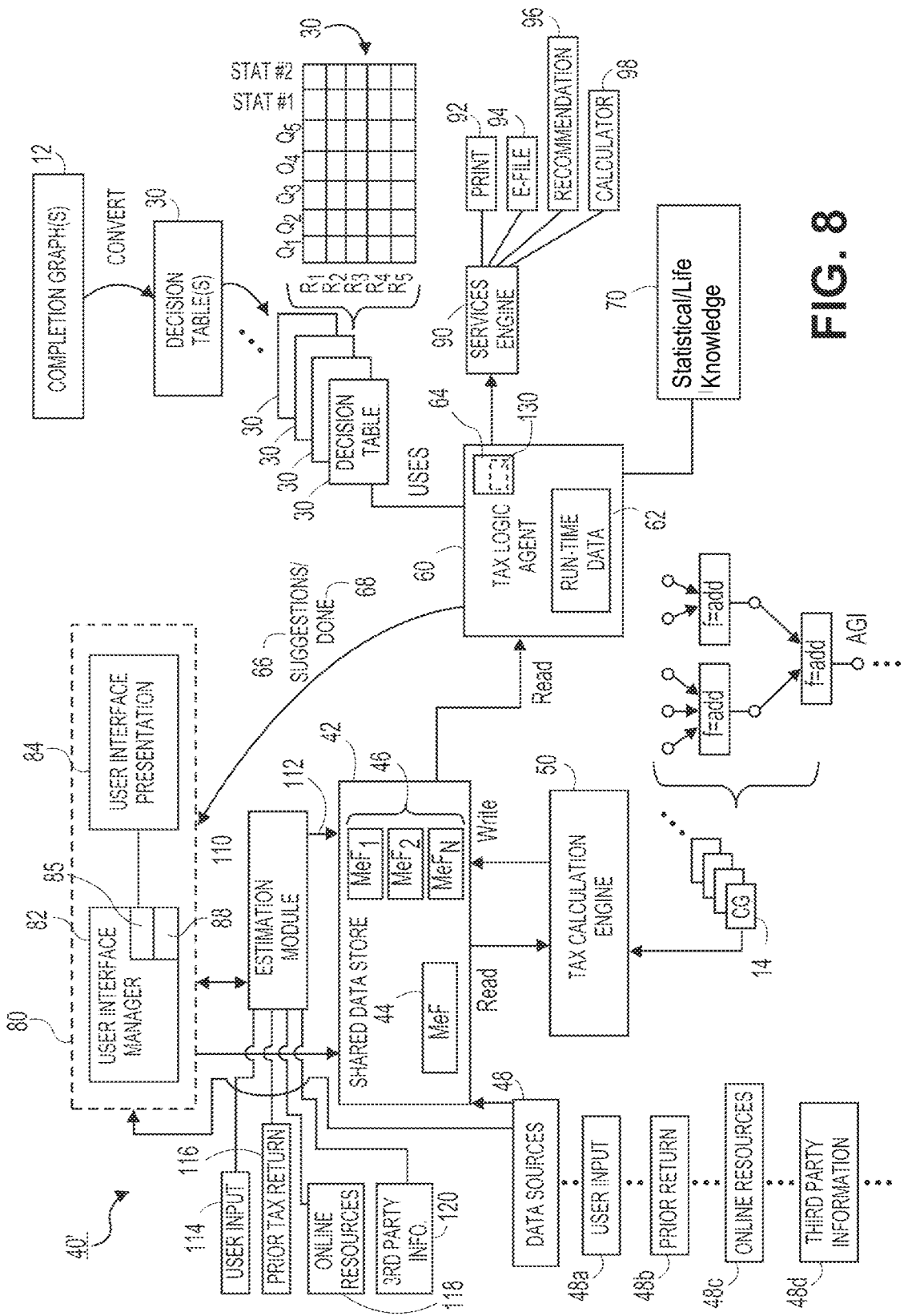
FIG. 8 schematically illustrates another system for calculating taxes using rules and calculations based on a declarative data structures.

FIG. 8 illustrates another schematic illustration of a system 40' for calculating taxes using rules and calculations based on declarative data structures. Those elements equivalent to the embodiment of FIG. 7 are labeled with the same element numbers. In this alternative embodiment, the system 40' includes an estimation module 110 that writes to the shared data store 42 with estimates 112 or guesses of one or more data fields contained within the shared data store 42. The estimates 112 or guesses may pertain to any number of tax topics and may include alphanumeric characters, a response to a Boolean operation, text, and the like. In this particular embodiment, the estimate module 110 assigns an estimated value to one or more data fields of the schema 44 contained in the shared data store 42. The estimated value may be obtained in a number of ways. In one aspect, user input 114 is used to generate the estimated value. For example, the user may be prompted by UI control 80 with a prompt 84 to enter a guess or estimate on a particular data field. In another aspect, a prior tax return or multiple tax returns 116 can be used to generate an estimated value. For example, taxpayer A may have a history of the past three years of tax return data (e.g., stored as proprietary or standardized files) stored or otherwise made available to tax preparation software 100 that shows yearly dividend income of $1,200, $1,350, and $1,400. The estimation module 110 may generate an average of $1,317 to be used as an estimate for a current year return. Alternatively, the estimation module 110 may employ more robust analytics than merely computing an average or mean value. In the context of this example, the estimation module 100 seeing that dividends appear to be increasing in value each year may attempt to find a function (e.g., linear or non-linear function) that fits the observable data and can be used to better estimate current year tax data. For example, in the above example, a curve fitting function may estimate current year dividend at $1,525 rather than the average value of $1,317.

Online resources 118 may also be used by the estimation module 110 to provide estimated values. Online resources 118 include, for example, financial services accounts for a taxpayer that can be accessed to estimate certain values. For example, a taxpayer may have one or more accounts at a bank, credit union, or stock brokerage. These online resources 118 can be accessed by the tax preparation software 100 to scrape, copy, or otherwise obtain tax relevant data. For example, online resources 118 may be accessed to estimate the value of interest income earned. A user's linked accounts may be accessed to find all of the interest income transactions that have occurred in the past year. This information may be used as the basis to estimate total interest income for the taxpayer. In another example, online resources 118 may be accessed to estimate the amount of mortgage interest that has been paid by a taxpayer. Instead of waiting for a Form 1098 from the mortgage service provider.

Still referring to FIG. 8, third party information 120 may be used by the estimation module 110 to arrive at an estimated value for one or more data fields. Third party information 120 may include credit bureaus, government databases, and the like. For example, credit bureaus may include information on student loans taken out by a taxpayer. This information may be used by the estimation module 110 to determine the amount of interest paid on such loans which may be qualified student loan interest.

It should also be understood that the estimation module 110 may rely on one or more inputs to arrive at an estimated value. For example, the estimation module 110 may rely on a combination of prior tax return data 116 in addition to online resources 118 to estimate a value. This may result in more accurate estimations by relying on multiple, independent sources of information. The UI control 80 may be used in conjunction with the estimation module 110 to select those sources of data to be used by the estimation module 110. For example, user input 114 will require input by the user of data using a user interface presentation 84. The UI control 80 may also be used to identify and select prior tax returns 116. Likewise, user names and passwords may be needed for online resources 118 and third party information 120 in which case UI control 80 will be needed to obtain this information from the user.

In one embodiment of the invention, the estimated values or other estimated data provided by the estimation module 110 may be associated with one or more attributes 122 as illustrated in FIG. 9. The attributes 122 may indicate a label such as a source 124 or provenance of the estimated value (e.g., user input 114, prior tax return 116, etc.). In the example of FIG. 9, a source ID 124 indicates the particular source of the data that is used for the field. For example, source ID 01 may correspond to user input 114. Source ID 03 may correspond to a prior year tax return 116. Source ID 05 may correspond to online resources 118 while source ID 06 corresponds to third party information 120.

The attributes 122 may also include a confidence level 126 associated with each estimated field. The confidence level 126 is indicative of the level of trustworthiness of the estimated user-specific tax data and may be expressed in a number of different ways. For example, confidence level 126 may be broken down to intervals (e.g., low, medium, high) with each estimated value given an associated label (e.g., L—low, M—medium, H, high). Alternatively, confidence levels 126 may be described along a continuum without specific ranges (e.g., range from 0.0 to 1.0 with 0.0 being no confidence and 1.0 with 100% confidence). The confidence level 126 may be assigned based on the source of the estimated user-specific tax data (e.g., source #1 is nearly always correct so estimated data obtained from this source will be automatically assigned a high confidence level).

In some embodiments, the estimation module 110 may acquire a plurality of estimates from different sources (e.g., user input 1145, prior year tax returns 116, online resources 118, third party information 120) and only write the "best" estimate to the shared data store 42 (e.g., the source with the highest confidence level 126). Alternatively, the estimation module 110 may be configured to ignore data (e.g., sources) that have confidence levels 126 below a pre-determined threshold. For example, all "low" level data from a source may be ignored. Alternatively, all the data may be stored in the shared data store 42 including, for example, the attribute 122 of the confidence level 126 with each entry. The tax calculation engine 50 may ignore data entries having a confidence level below a pre-determined threshold. The estimation module 110 may generate a number of different estimates from a variety of different sources and then writes a composite estimate based on all the information from all the different sources. For example, sources having higher confidence levels 126 may be weighted more than other sources having lower confidence levels 126.

Still referring to FIG. 9, another attribute 122 may include a confirmation flag 128 that indicates that a taxpayer or user of the tax preparation software 100 has confirmed a particular entry. For example, confirmed entries may be given an automatic "high" confidence value as these are finalized by the taxpayer. Another attribute 122 may include a range of values 130 that expresses a normal or expected range of values for the particular data field. The range of values 130 may be used to identify erroneous estimates or data entry that appear to be incorrect because they fall outside an intended range of expected values. Some estimates, such as responses to Boolean expressions, do not have a range of values 130. In this example, for example, if the number of estimates dependents is more than five (5), the tax logic agent 60 may incorporate into the rules engine 64 attribute range information that can be used to provide non-binding suggestions to the UI control 80 recommending a question to ask the taxpayer about the high number of dependents (prompting user with "are you sure you have 7 dependents"). Statistical data may also be used instead of specific value ranges to identify suspect data. For example, standard deviation may be used instead of a specific range. When a data field exhibits statistical deviation beyond a threshold level, the rules engine 64 may suggest a prompt or suggestion 66 to determine whether the entry is a legitimate or not. Additional details regarding methods and systems that are used to identify suspect electronic tax data may be found in U.S. Pat. No. 8,346,635 which is incorporated by reference herein.

Referring back to FIG. 8, in this embodiment, the tax logic agent 64 includes within or as part of the rules engine 64 attribute rules 130 that are incorporated and used to generate the non-binding suggestion. For example, as explained above, when an estimated value is input or otherwise transferred to the shared data structure 42, this estimated value may fall outside a generally accepted range of values. This may prompt the TLA 60 to suggest a confirmatory question to the UI control 80 to confirm the accuracy of the estimated value that has been obtained. Likewise, various data fields may be associated with a low level of confidence as seen in FIG. 9. Questions relating to tax topics that incorporate these low confidence fields may be promoted or otherwise ranked higher so that accurate values may be obtained from the taxpayer. Conversely, if a particular estimated tax field is associated with a high level of confidence, questions concerning this field may be demoted to a lower importance using the attribute rules 130. For example, multiple fields with a high level of confidence could be presented to the user in a single interview screen to confirm the accuracy of this information without the need to walk through individual questions.

In some embodiments, each estimated value produced by the estimation module 110 will need to be confirmed by the user using the UI control 80. For example, the user interface manager 82 may present estimated data fields to the user for confirmation or verification using a user interface presentation 84. In other embodiments, however, the user may override data using the user interface presentation 84. Some estimated data, for example, data having a high confidence level 126 may not need to be confirmed but can be assumed as accurate.

Figure 10:
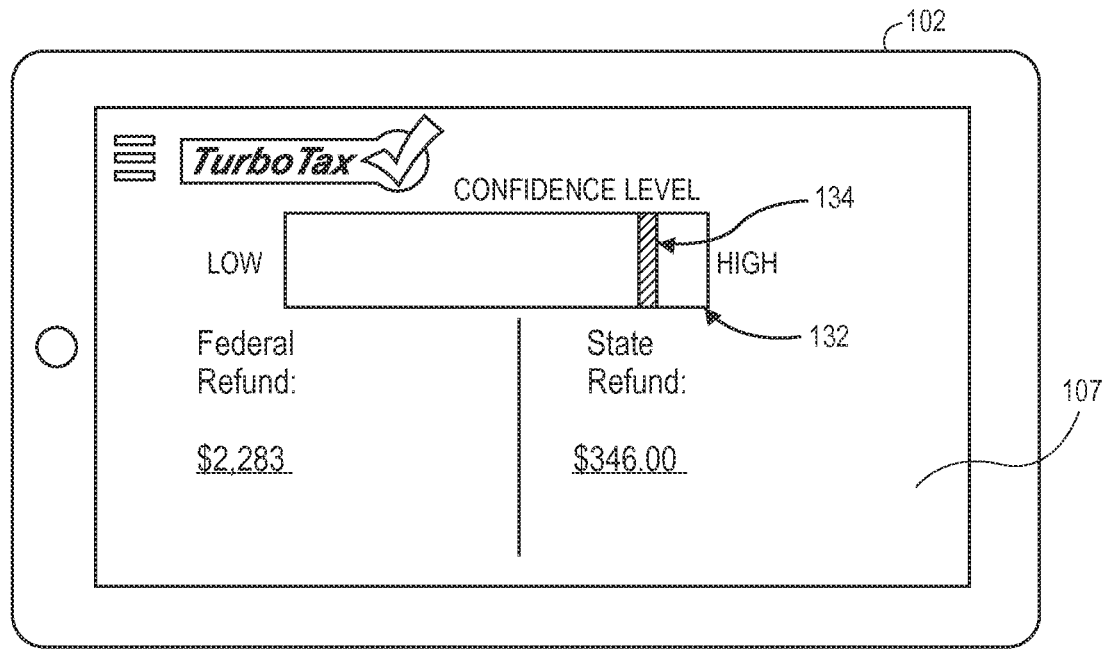
FIG. 10 illustrates a computing device with an illustrative user interface presentation that incorporates the attribute rules to arrive a confidence level for tax calculations.

FIG. 10 illustrates an illustrative user interface presentation 84 on a computing device 102 that incorporates the attribute rules 130 to arrive at a confidence level for tax calculations. The user interface presentation 84 appears on a screen 104 of the computing device 102. As seen in FIG. 10, the dollar amount of the calculated federal refund in listed along with the refund amount of the calculated state refund. The user interface presentation 84 includes a confidence level indicator 132. The confidence level indicator 132 indicates the overall or aggregate confidence level in the tax calculation. The tax calculation could include a refund amount as illustrated in FIG. 10 but it may also include a taxes due amount. In the example given in FIG. 10, the confidence level indicator 132 is expressed as a bar 134 in a bar meter type implementation.

Figure 11:
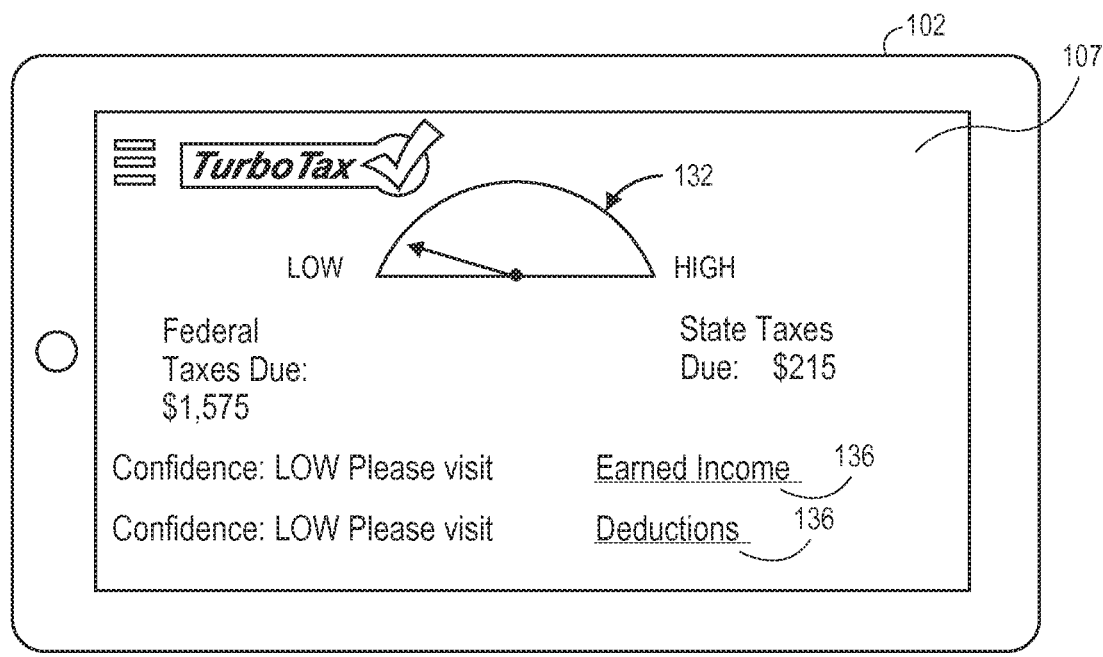
FIG. 11 illustrates a computing device with another illustrative user interface presentation that incorporates the attribute rules to arrive a confidence level for tax calculations.

The confidence level indicator 132 may take a number of different forms, however. For example, the confidence level indicator 132 may be in the form of a gauge or the like that such as that illustrated in FIG. 11. In the example, of FIG. 11, the confidence level indicator 132 is indicated as being "low." Of course, the confidence level indicator 132 may also appear as a percentage (e.g., 0% being low confidence, 100% being high confidence) or as a text response (e.g., "low," "medium," and "high" or the like). Other graphic indicia may also be used for the confidence level indicator 132. For example, the color of a graphic may change or the size of the graphic may change as a function of level of confidence. Referring to FIG. 11, in this instance, the user interface presentation 84 may also include hyperlinked tax topics 136 that are the primary sources for the low confidence in the resulting tax calculation. For example, the reason that the low confidence is given is that there is low confidence in the amount listed on the taxpayer's W-2 form that has been automatically imported into the shared data store 42. This is indicated by the "LOW" designation that is associated with the "earned income" tax topic. In addition, in this example, there is low confidence in the amount of itemized deductions being claimed by a taxpayer. This is seen with the "LOW" designation next to the "deductions" tax topic. Hyperlinks 136 are provided on the screen so that the user can quickly be taken to and address the key drivers in the uncertainty in the calculated tax liability.

Figure 12:
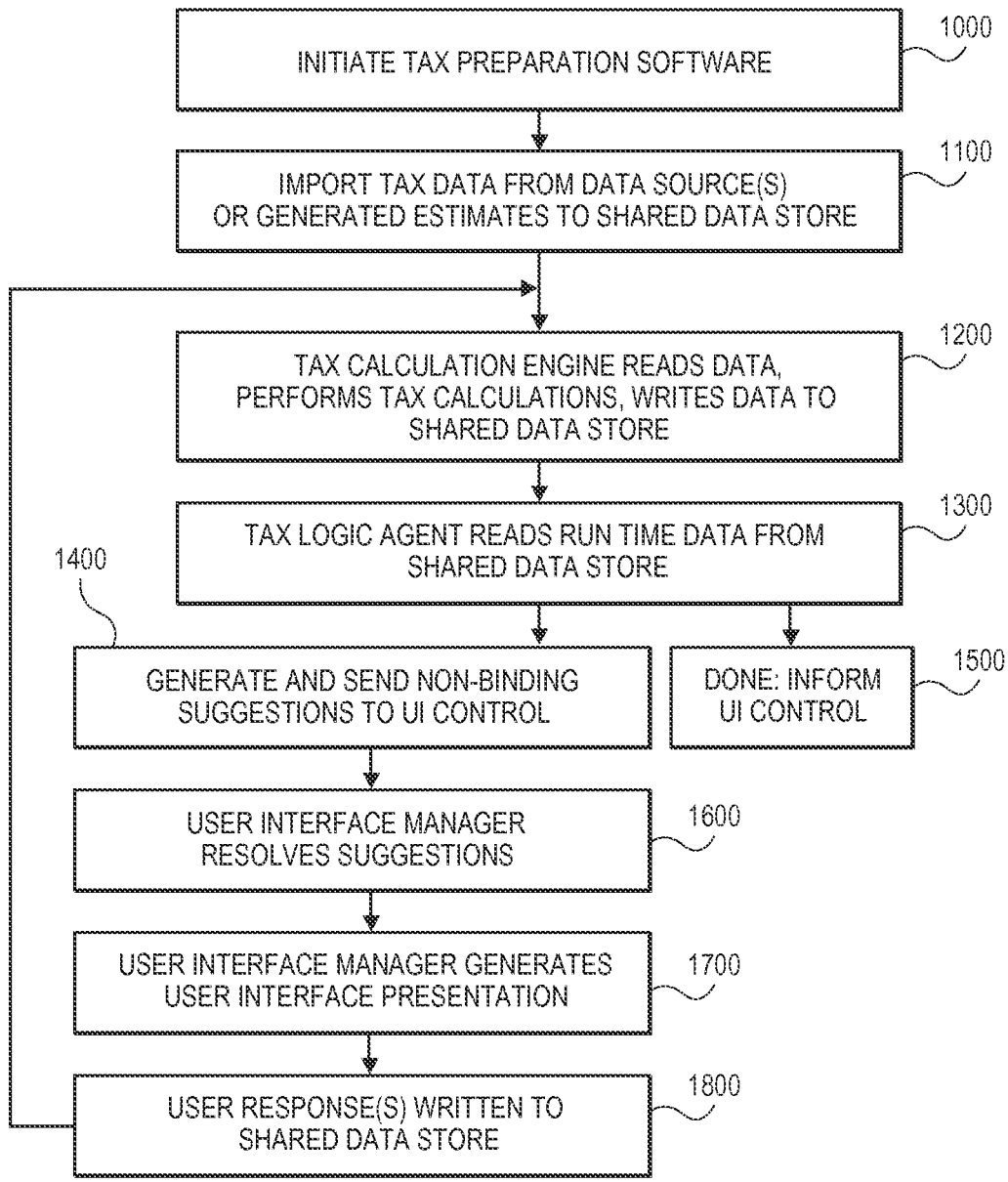
FIG. 12 illustrates a flowchart of operations used in connection with a method of calculating tax liability according to one embodiment.

FIG. 12 illustrates the operations of one illustrative method for calculating tax liability according to an embodiment of the invention. In operation 1000, a user initiates the tax preparation software 100 on a computing device 102 as seen, for example, in FIG. 13. The tax preparation software 100 may reside on the actual computing device 102 that the user interfaces with or, alternatively, the tax preparation software 100 may reside on a remote computing device 103 such as a server or the like as illustrated. In such an instances, the computing device 102 that is utilized by the user or tax payer communicates via the remote computing device 103 using an application 105 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

Referring back to FIG. 12, after initiating the tax preparation software 100, the tax preparation software 100, in operation 1100, gathers or imports tax related data from the one or more data sources 48 as illustrated in FIGS. 7 and 8. Note that the gathering of tax related data from the one or more data sources 48 may occur at the time the tax preparation software 100 is run. Alternatively, the gathering of tax related data from the one or more data sources 48 may occur over a period of time. For example, data sources 48 may be periodically queried over time (e.g., during a tax reporting year) whereby updated information is stored in a database (not shown) or the like that is then accessed by the tax preparation software 100. This option may improve the efficiency and speed of tax return preparation as the information is already available.

In one embodiment, the gathering or importation of data sources such as prior tax returns 48b, online resources 48c, and third party information 48d is optional. For example, a taxpayer may want to start the process from scratch without pulling information from other sources. However, in order to streamline and more efficiently complete a tax return other users may desire to obtain tax related information automatically. This would reduce the number of interview or prompt screens that are presented to the user if such information were obtained automatically by the tax preparation software 100. A user may be given the opportunity to select which data sources 48 they want accessed and searched for relevant tax related data that will be imported into the shared data store 42. A user may be asked to submit his or her account and password information for some data sources 48 using the UI control 80. Other data sources 48 such as some third party data sources 48*d* may be accessed without such information.

Next, as seen in operation 1200, after the schema 44 is populated with the various imported or entered data fields from the data sources 48, the tax calculation engine 50, using the calculation graphs 14, reads data from the shared data store 42, performs tax calculations, and writes back data to the shared data store 42. The schema 44 may also be populated with estimates or educated guesses as explained herein using the estimation module 110 as described in the context of the embodiment of FIG. 8. Operation 1200 may utilize the method 1210, as described above, to efficiently perform the tax calculations using the tax calculation engine 50 and the calculation graph(s) 14.

In operation 1300, the tax logic agent 60 reads the run time data 62 which represents the instantiated representation of the canonical tax schema 44 at runtime. The tax logic agent 60 then utilizes the decision tables 30 to generate and send non-binding suggestions 66 to the UI control 80 as seen in operation 1400. Alternatively, the tax logic agent 60 may determine that completeness has been achieved across the tax topics in which case a done instruction may be delivered to the UI control as seen in operation 1500. If not done, the process continues whereby the user interface manager 82 will then process the suggestion(s) 66 using the suggestion resolution element 88 for resolving of how to respond to the incoming non-binding suggestions 66 as seen in operation 1600. The user interface manager 82 then generates a user interface presentation 84 to the user as seen in operation 1700 whereby the user is presented with one or more prompts. The prompts may include questions, affirmations, confirmations, declaratory statements, and the like. The prompts are displayed on a screen 104 of the computing device 102 whereby the user can then respond to the same by using one or more input devices associated with the computing device 102 (e.g., keyboard, mouse, finger, stylus, voice recognition, etc.).

Still referring to FIG. 12, as seen in operation 1800, the response or responses that are given by the user of the tax preparation software 100 are then written back to the shared data store 42 to thereby update all appropriate fields of the schema 44. The process then continues with operation 1200 and proceeds as explained above until a completeness state has been reached and a done instruction is sent to the UI control 80.

Figure 14:
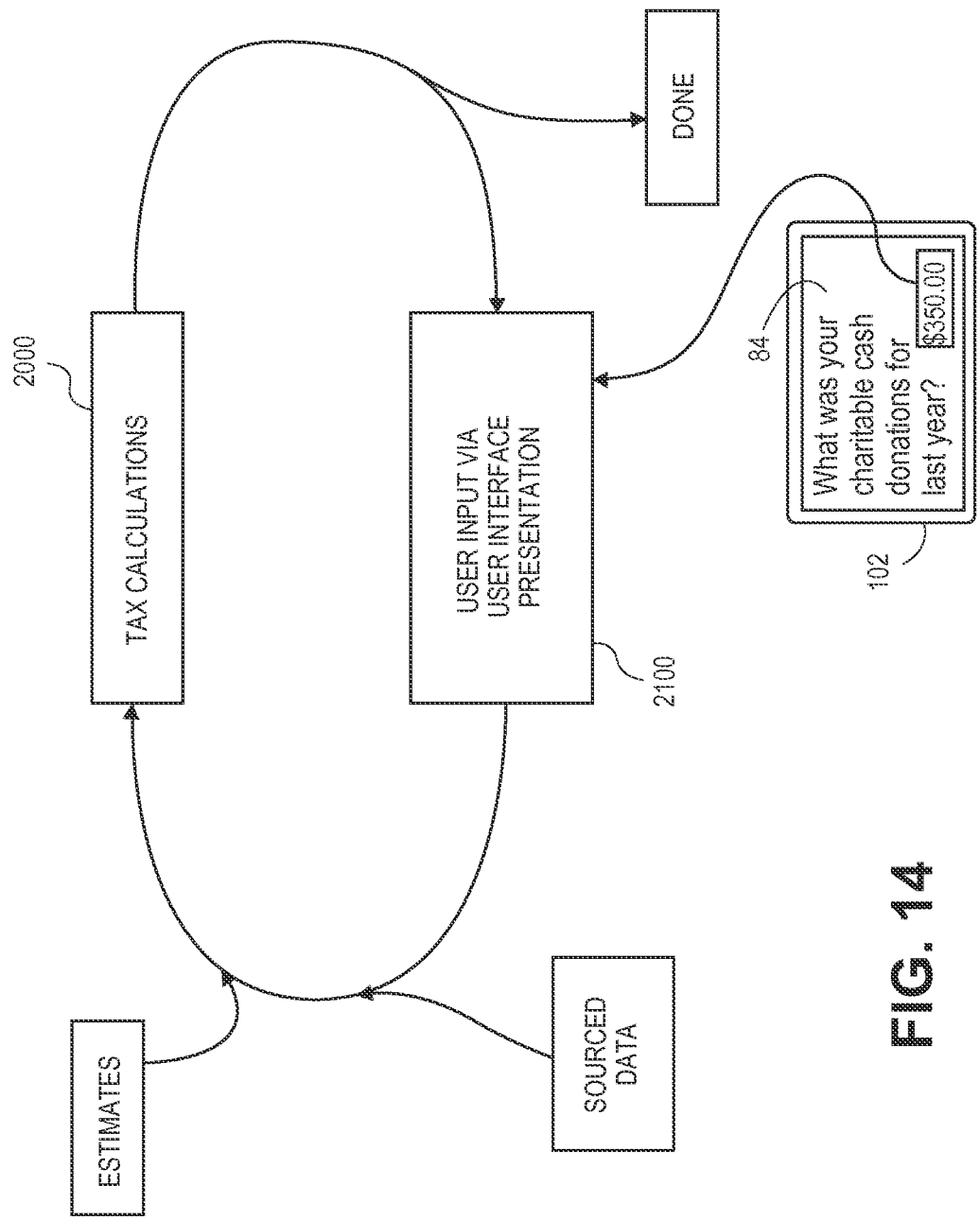
FIG. 14 schematically illustrates a process whereby a combination of user inputs, sourced data, and estimates are used in connection with a tax calculation.

FIG. 14 illustrates a schematic representation of one preferred embodiment of the invention in which user input via the user interface presentation 84 is minimized. As seen in FIG. 14, tax calculations 2000 are performed based on a number of inputs including user inputs 2100 that are input using the user interface presentation 84 that appears on the computing device 102. It should be noted that tax calculations 2000 can be made even though there may be some missing data entry that is not incorporated into the tax calculation 2000. While the tax return may not be in a condition to be filed, the tax liability or a sub-component thereof (e.g., total itemized deductions, or gross income) can be calculated. These user inputs 2100 are combined with data sources 2200 as well as estimates 2300. Data sources 2200 are obtained, for example, as described previously with respect to data sources 48. Estimates 2300 are obtained, as explained previously, using the estimation module 110. In one aspect of the invention, a large portion of data needed for the calculation and preparation of taxes is obtained either by data sources 2200, estimates 2300 or both. The user input 2100 aspect may be minimized by first populating relevant fields using data sources 2200 and/or estimates 2300. The user input 2100 may be used to input missing data that was not otherwise obtained using data sources 2200 or estimates 2300. User input 2100, however, may also be used to verify estimates or verify sourced data. For example, prior to being incorporated into tax calculations (e.g., stored within the shared data store 42), the user may be prompted to accept, reject, or alter the values of sourced data 2200 or estimates 2300. User input 2100 may also be used to resolve conflicts. For example, soured data 2200 and estimates 2300 may conflict with one another and user input 2100 may be required to resolve the conflict. User input 2100 may also be used to accept or reject sourced data 2200 or estimates 2300. For example, a user may know that a particular estimate 2300 is incorrect and plans to input this particular value manually. The user may be given the option to override the importation and utilization of sourced data 2200 and estimates 2300.

Figure 15:
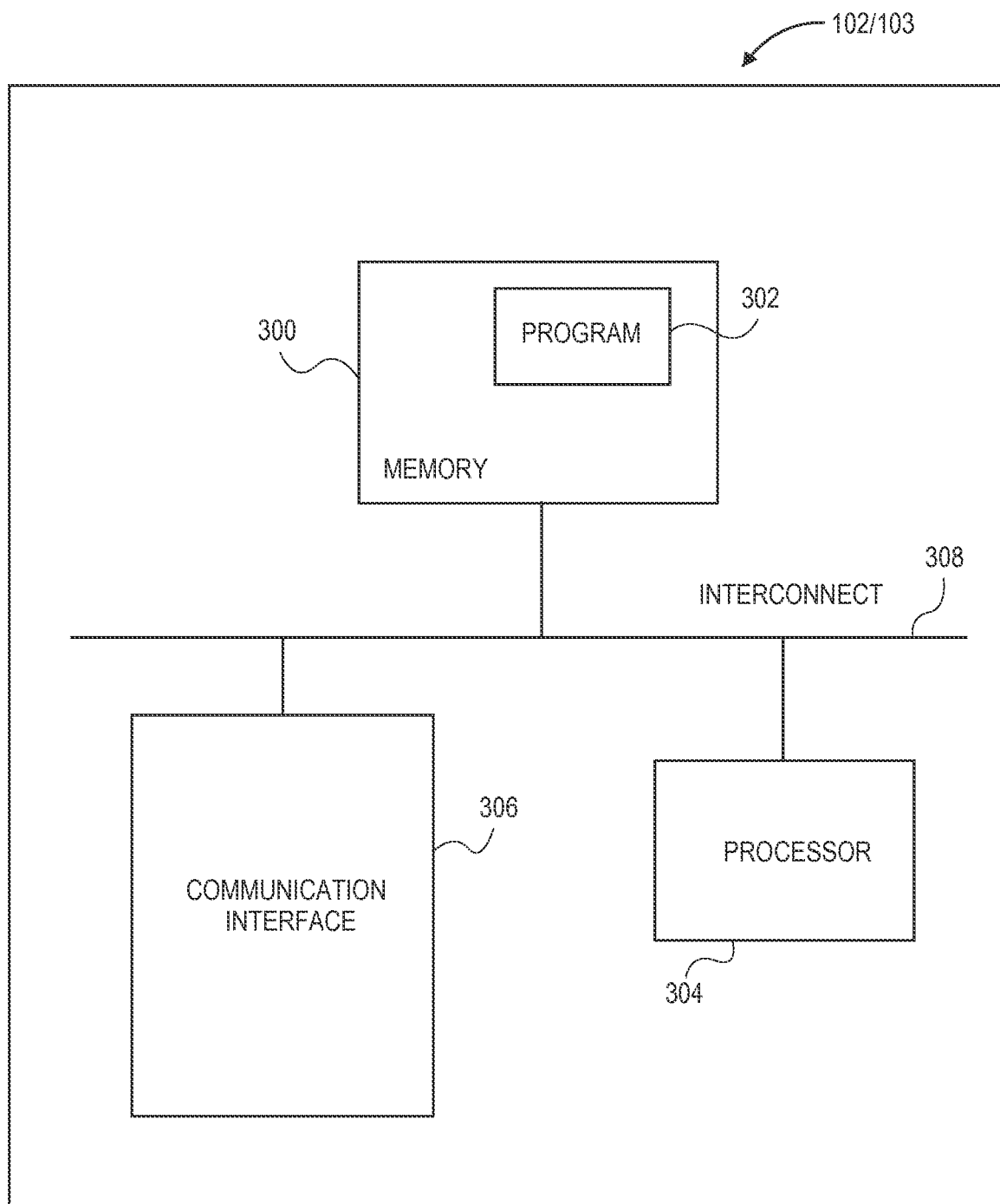
FIG. 15 illustrates generally the components of a computing device that may be utilized to execute the software for automatically calculating or determining tax liability and preparing a tax return based thereon.

FIG. 15 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 15 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method, comprising:

accessing, by a modular tax logic agent of a computerized tax return preparation application comprising instructions executed by a computing device and that is in communication with a user interface controller, a shared data store storing user-specific tax data, and a statistical knowledge module of the computerized tax return preparation application;

accessing, by the modular tax logic agent, a taxpayer data profile for a taxpayer for which an electronic tax return is being prepared using the tax return preparation application, the taxpayer data profile including personal data and tax data regarding the taxpayer;

accessing, by the modular tax logic agent, the statistical knowledge module having a plurality of tax matter correlations, each correlation having a quantitative relevancy score quantifying a probability of a correlation between a taxpayer attribute and a tax related aspect;

accessing, by the modular tax logic agent, a plurality of decision tables collectively representing a completion graph that completes all required data fields for computing the electronic tax return, each decision table comprising a plurality of columns, a plurality of rows, and a plurality of cells defined by respective intersections of respective rows and respective columns, where respective columns correspond to respective tax questions and respective rows correspond to respective completion paths defined by respective rules, each cell in a respective row having a logic operator corresponding to the tax question of each cell's respective column such that completion of each respective row is determined by the logic operators in the respective row;

analyzing, by the modular tax logic agent, the user-specific tax data and traversing, by the modular tax logic agent, the decision tables to determine one or more suggested tax matters and non-binding suggestions that obtains missing tax data required to complete the electronic tax return, the modular tax logic agent eliminating based on the user-specific tax data, at least one row and its respective completion path that reduces possible suggested tax questions;

determining, by the modular tax logic agent, a relevancy ranking for each of the suggested tax questions using the quantitative relevancy scores in the statistical knowledge module;

providing, by the modular tax logic agent the suggested tax matters, relevancy rankings and non-binding suggestions to the user interface controller;

receiving, by the user interface controller, the suggested tax matters relevancy rankings and non-binding suggestions;

determining, by the user interface controller, a tax question from the non-binding suggestions based at least in part upon the suggested tax matters, the relevancy rankings and the non-binding suggestions;

generating, by the user interface controller, an interview screen having the determined tax question, presenting the interview screen to the user through a display of the computing device, receiving, by the user interface controller, user input in response to the determined question, and updating, by the user interface controller, the shared data store based at least in part upon the user input, where the user interface controller inputs tax data in a non-linear manner based on relevancy to the user.

2. The method of claim 1, further comprising:

the modular tax logic agent generating the tax matter correlations in the statistical knowledge module by a process comprising:

accessing a data source having a plurality of data records, each data record comprising a taxpayer attribute and a tax related aspect for a respective taxpayer; and analyzing the plurality of data records and determining a correlation between the taxpayer attribute and the tax related aspect, and determining a probability for the correlation.

3. The method of claim 2, where the modular tax logic agent utilizes a training algorithm that determines the correlation between the taxpayer attribute and the tax related aspect.

4. The method of claim 2, where the modular tax logic agent utilizes a scoring algorithm that determines the quantitative relevancy score for each correlation between the taxpayer attribute and the tax related aspect.

5. The method of claim 2, where the data source comprises a database of previously filed electronic tax returns and the data records comprise tax data from the previously filed tax returns.

6. The method of claim 2, where the data source is selected from the group consisting of a database of previously filed electronic tax returns, a database of electronic financial account data, and electronic social media account data.

7. The method of claim 2, where the data source comprises electronic data regarding previous user experiences in utilizing the computerized tax return preparation application.

8. The method of claim 1, where the tax matter correlations comprise:

a correlation between taxpayer age and homeownership; a correlation between taxpayer address and homeownership; a correlation between taxpayer employment and homeownership; a correlation between taxpayer age and having dependents;

a correlation between taxpayer married status and need for spouse tax information; a correlation between taxpayer income and affordable care act information; a correlation between taxpayer income and charitable deductions; a correlation between taxpayer age and social security benefits; and a correlation between income and stock investment information.

9. The method of claim 1, further comprising the computerized tax return preparation application automatically accessing a remote data source and automatically importing tax data that completes the missing tax responsive to the tax matters for obtaining missing tax data.

10. A computerized tax return preparation system, comprising:

a computerized tax return preparation application comprising computer-executable instructions stored in a memory of a computing device and executable by a processor of the computing device that prepares an electronic tax return and comprising:

a shared data store stores user-specific tax data; a modular tax logic agent in communication with the shared data store; a user interface controller in communication with the shared data store and the modular tax logic agent; and a statistical knowledge module in communication with the modular tax logic agent, the modular tax logic agent being configured to:

access user-specific tax data in the shared data store;

access a taxpayer data profile for a taxpayer for which the electronic tax return is being prepared, the taxpayer data profile including personal data and tax data regarding the taxpayer;

access a statistical knowledge module having a plurality of tax matter correlations, each correlation having a quantitative relevancy score quantifying a probability of a correlation between a taxpayer attribute and a tax related aspect;

access a plurality of decision tables collectively representing a completion graph that completes all required data fields that computes the electronic tax return, each decision table comprising a plurality of columns, a plurality of rows and re a plurality of cells defined by respective intersections of respective rows and columns, where respective columns correspond to respective tax questions and respective rows correspond to respective completion paths defined by respective rules, each cell in a respective row having a logic operator corresponding to the tax question of each cell's respective column such that completion of each respective row is determined by the logic operators in the respective row;

analyze the user-specific tax data and traversing the decision tables that determines one or more suggested tax matters and non-binding suggestions that obtains missing tax data required to complete the electronic tax return, the modular logic agent eliminating based on the user-specific tax data, at least one row and its respective completion path that reduces possible suggested tax questions;

determine a relevancy ranking for each of the suggested tax questions using the quantitative relevancy scores in the statistical knowledge module; and provide the suggested tax matters, relevancy rankings and non-binding suggestions to the user interface controller;

the modular user interface controller being configured to:

receive the suggested tax matters, relevancy rankings and non-binding suggestions:

determine a tax question from the non-binding suggestions based at least in part upon the suggested tax matters, the relevancy rankings and the nonbinding suggestions:

generate an interview screen having the determined tax question;

present the interview screen to the user through a display of the computing device;

receive user input in response to the determined question and update the shared data store based at least in part upon the user inputs where the modular user interface controller is configured to input tax data in a nonlinear manner based on relevancy to the user.

11. The system of claim 10, where the modular tax logic agent is further configured to generate the tax matter correlations in the statistical knowledge module by a process comprising:

accessing a data source having a plurality of data records, each data record comprising a taxpayer attribute and a tax related aspect for a respective taxpayer; and analyzing the plurality of data records and determining a correlation between the taxpayer attribute and the tax related aspect, and determining a probability for the correlation.

12. The system of claim 11, where the modular tax logic agent is configured to utilize a training algorithm that determines the correlation between the taxpayer attribute and the tax related aspect.

13. The system of claim 11, where the modular tax logic agent is configured to utilize a scoring algorithm that determines the quantitative relevancy score.

14. The system of claim 11, where the data source comprises a database of previously filed electronic tax returns and the data records comprise tax data from the previously filed electronic tax returns.

15. The system of claim 11, where the data source is selected from the group consisting of a database of previously filed electronic tax returns, a database of electronic financial account data, and electronic social media account data.

16. The system of claim 11, where the data source comprises electronic data regarding previous user experiences in utilizing the computerized tax return preparation application.

17. The system of claim 10, where the tax matter correlations comprise:

a correlation between taxpayer age and homeownership; a correlation between taxpayer address and homeownership; a correlation between taxpayer employment and homeownership; a correlation between taxpayer age and having dependents;

a correlation between taxpayer married status and need for spouse tax information; a correlation between taxpayer income and affordable care act information; a correlation between taxpayer income and charitable deductions; a correlation between taxpayer age and social security benefits; and a correlation between income and stock investment information.

18. An article of manufacture comprising a non-transitory computer program carrier readable by a computer and embodying instructions of a computerized tax return preparation application that can be stored in a memory of the computer and executed by a processor of the computer that performs a method comprising:

accessing, by a modular tax logic agent of the computerized tax return application and that is in communication with a user interface controller, a shared data store storing user-specific tax data, and a statistical knowledge module of the computerized tax return application;

accessing, by the modular tax logic agent, a taxpayer data profile for a taxpayer for which an electronic tax return is being prepared using the tax return preparation application, the taxpayer data profile including personal data and tax data regarding the taxpayer;

accessing, by the modular tax logic agent, the statistical knowledge module having a plurality of tax matter correlations, each correlation having a quantitative relevancy score quantifying a probability of a correlation between a taxpayer attribute and a tax related aspect;

accessing, by the modular tax logic agent, a plurality of decision tables collectively representing a completion graph that completes all required data fields that computes the electronic tax return, each decision table comprising a plurality of columns, a plurality of rows, and a plurality of cells defined by respective intersections of respective rows and respective columns, where respective columns correspond to respective tax questions and respective rows correspond to respective completion paths defined by respective rules, each cell in a respective row having a logic operator corresponding to the tax question of each cell's respective column such that completion of each respective row is determined by the logic operators in the respective row;

analyzing, by the modular tax logic agent, the user-specific tax data and traversing, by the modular tax logic agent, the decision tables that determines one or more suggested tax matters and non-binding suggestions that obtains missing tax data required to complete the electronic tax return, the modular tax logic agent eliminating based on the user-specific tax data, at least one row and its respective completion path that reduce possible suggested tax questions;

determining, by the modular tax logic agent, a relevancy ranking for each of the suggested tax questions using the quantitative relevancy scores in the statistical knowledge module;

providing, by the modular tax logic agent the suggested tax matters, relevancy rankings and non-binding suggestions to the user interface controller;

receiving, by the user interface controller, the suggested tax matters relevancy rankings and non-binding suggestions;

determining, by the user interface controller, a tax question from the non-binding suggestions based at least in part upon the suggested tax matters the relevancy rankings and the non-binding suggestions;

generating, by the user interface controller, an interview screen having the determined tax question;

presenting the interview screen to the user through a display of the computing device;

receiving, by the user interface controller, user input in response to the determined question and updating, by the user interface controller, the shared data store based at least in part upon the user input, where the user interface controller is configured to input tax data in a non-linear manner based on relevancy to the user.

19. The article of claim 18, where the modular tax logic agent generates the tax matter correlations in the statistical knowledge module by a process comprising accessing a data source having a plurality of data records, each data record comprising a taxpayer attribute and a tax related aspect for a respective taxpayer; and analyzing the plurality of data records and determining a correlation between the taxpayer attribute and the tax related aspect, and determining a probability for the correlation.

20. The article of claim 19, where the modular tax logic agent utilizes a training algorithm that determines the correlation between the taxpayer attribute and the tax related aspect.

21. The article of claim 19, where the modular tax logic agent utilizes a scoring algorithm that determines the quantitative relevancy score.

22. The article of claim 19, where the data source comprises a database of previously filed electronic tax returns and the data records comprise tax data from the previously electronic filed tax returns.

23. The article of claim 19, where the data source comprises electronic data regarding previous user experiences in utilizing the computerized tax return preparation application.

24. The article of claim 18, where the data source is selected from the group consisting of a database of previously filed electronic tax returns, a database of electronic financial account data, and electronic social media account data.

25. The article of claim 18, where the tax matter correlations comprise:

a correlation between taxpayer age and homeownership; a correlation between taxpayer address and homeownership; a correlation between taxpayer employment and homeownership; a correlation between taxpayer age and having dependents;

a correlation between taxpayer married status and need for spouse tax information; a correlation between taxpayer income and affordable care act information; a correlation between taxpayer income and charitable deductions; a correlation between taxpayer age and social security benefits; and a correlation between income and stock investment information.

* * * * *